US009992800B2

(12) United States Patent
Yerramalli et al.

(10) Patent No.: US 9,992,800 B2
(45) Date of Patent: Jun. 5, 2018

(54) TECHNIQUES FOR PERFORMING A RANDOM ACCESS PROCEDURE IN AN UNLICENSED SPECTRUM

(71) Applicant: QUALCOMM Incorporated, San Diego, CA (US)

(72) Inventors: Srinivas Yerramalli, San Diego, CA (US); Peter Gaal, San Diego, CA (US); Chirag Patel, San Diego, CA (US); Arumugam Chendamarai Kannan, San Diego, CA (US); Juan Montojo, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/586,840

(22) Filed: May 4, 2017

(65) Prior Publication Data
US 2017/0332409 A1 Nov. 16, 2017

Related U.S. Application Data

(60) Provisional application No. 62/336,453, filed on May 13, 2016.

(51) Int. Cl.
*H04W 16/14* (2009.01)
*H04W 74/08* (2009.01)
(Continued)

(52) U.S. Cl.
CPC ........... *H04W 74/0833* (2013.01); *H04L 1/00* (2013.01); *H04L 1/08* (2013.01); *H04L 5/00* (2013.01);
(Continued)

(58) Field of Classification Search
CPC ............. H04W 72/0473; H04W 24/08; H04W 72/042; H04W 72/0446; H04W 16/26;
(Continued)

(56) References Cited

U.S. PATENT DOCUMENTS

2015/0208415 A1 7/2015 Xu et al.
2015/0296518 A1* 10/2015 Yi .............................. H04L 1/08
370/336
(Continued)

FOREIGN PATENT DOCUMENTS

| GB | 2530566 A | 3/2016 |
|----|-----------|--------|
| WO | WO-2012051119 A1 | 4/2012 |
| WO | WO-2015021315 A1 | 2/2015 |

OTHER PUBLICATIONS

ISA/EP, International Search Report and Written Opinion of the International Searching Authority, Int'l Application No. PCT/US2017/031235, dated Sep. 18, 2017, European Patent Office, Rijswijk, NL, 18 pgs.
(Continued)

*Primary Examiner* — Phuoc H Doan
(74) *Attorney, Agent, or Firm* — Liem T. Do

(57) ABSTRACT

Techniques are described for wireless communication. One method includes transmitting a sequence of deterministic variations of random access data on at least one interlace of non-contiguous frequency resources allocated to a physical random access channel (PRACH) in an unlicensed spectrum, beginning at a first time; repeating the transmitting of the sequence of deterministic variations of random access data at least once, beginning at a second time; generating at least one modification of the sequence of deterministic variations of random access data, in which the at least one modification is generated according to a modification sequence; and transmitting on the at least one interlace,
(Continued)

beginning at a third time, the at least one modification of the sequence of deterministic variations of random access data.

30 Claims, 30 Drawing Sheets

(51) Int. Cl.
    *H04L 5/00*         (2006.01)
    *H04L 1/00*         (2006.01)
    *H04L 1/08*         (2006.01)

(52) U.S. Cl.
    CPC ........... *H04L 5/0041* (2013.01); *H04W 16/14* (2013.01); *H04W 74/0866* (2013.01)

(58) Field of Classification Search
    CPC   H04W 74/0833; H04W 24/10; H04L 5/0007; H04L 5/006
    USPC .......................... 370/235, 254, 329; 455/436
    See application file for complete search history.

(56) References Cited

U.S. PATENT DOCUMENTS

2016/0036578 A1     2/2016   Malladi et al.
2017/0105127 A1*   4/2017   Xiong .................. H04W 16/26

OTHER PUBLICATIONS

ISA/EPO, Partial International Search Report of the International Searching Authority, Int'l App. No, PCT/US2017/031235, dated Jul. 25, 2017, European Patent Office, Rijswijk, NL, 13 pgs.

\* cited by examiner

TECHNIQUES FOR PERFORMING A RANDOM ACCESS PROCEDURE IN AN UNLICENSED SPECTRUM

CROSS REFERENCES

The present Application for Patent claims priority to U.S. Provisional Patent Application No. 62/336,453 by Yerramalli, et al., entitled "Techniques For Performing A Random Access Procedure in an Unlicensed Spectrum," filed May 13, 2016, assigned to the assignee hereof.

BACKGROUND

Field of Disclosure

The following relates generally to wireless communication, and more specifically to techniques for interference suppression in bundled transmissions and techniques for performing a random access procedure in an unlicensed spectrum.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communication system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some cases, different UEs may have different wireless link configurations such as different bundling configurations which may enhance coverage for some devices. For example, some types of UEs may designed for automated communication. Automated wireless devices may include those implementing Machine-to-Machine (M2M) communication or Machine Type Communication (MTC), i.e., communication without human intervention. MTC devices and other UEs may implement coverage enhancement operations that include higher levels of repetition or lower modulation and coding (MCS) rates, which may be associated with a number of bundled transmission time intervals (TTIs) for each DL or UL transmission. In some cases, different bundling configurations may result in collisions of UL transmissions.

In some cases, a UE and base station may communicate over an unlicensed spectrum, or over different spectrums (e.g., a licensed spectrum and an unlicensed spectrum). With increasing data traffic in cellular networks that use a licensed spectrum, offloading of at least some data traffic to an unlicensed spectrum may provide a mobile network operator (or cellular operator) with opportunities for enhanced data transmission capacity. Use of an unlicensed spectrum may also provide service in areas where access to a licensed spectrum is unavailable.

SUMMARY

The present disclosure may relate generally to wireless communication systems, and more particularly to improved systems, methods, or apparatuses for coverage enhancement with MTC devices, and improved systems, methods or apparatuses for performing a random access procedure in an unlicensed spectrum. In some cases, a wireless device may be configured with a time domain bundling parameter indicating that a number of redundant versions of a transmission are to be transmitted. The device may then determine that a transmission is to be made using the time domain bundling parameter, and may identify a sequence of deterministic variations to be transmitted for each redundant transmission. The device may apply the sequence of deterministic variations to consecutive transmissions in order to enhance interference diversity of the transmissions, which may allow a receiver to enhance a signal to interference ratio for multiple different received transmissions. In some cases, a wireless device may transmit a sequence of deterministic variations of random access data on at least one interlace of non-contiguous frequency resources allocated to a physical random access channel (PRACH) in an unlicensed spectrum, beginning at a first time. The device may repeating the transmitting of the sequence of deterministic variations of random access data at least once, beginning at a second time. The device may also generate at least one modification of the sequence of deterministic variations of random access data, in which the at least one modification may be generated according to a modification sequence. The device may then transmit, on the at least one interlace and beginning at a third time, the at least one modification of the sequence of deterministic variations of random access data.

A method of wireless communication at a wireless device is described. The method may include identifying a time domain bundling parameter of a user equipment (UE) that indicates redundant versions of a transmission are to be transmitted from the UE, determining that data is to be transmitted from the UE according to the time domain bundling parameter, identifying a sequence of deterministic variations for use in transmitting the data, and applying the sequence of deterministic variations to consecutive transmissions of the data.

An apparatus for wireless communication at a wireless device is described. The apparatus may include means for identifying a time domain bundling parameter of a user equipment (UE) that indicates redundant versions of a transmission are to be transmitted from the UE, means for determining that data is to be transmitted from the UE according to the time domain bundling parameter, means for identifying a sequence of deterministic variations for use in transmitting the data, and means for applying the sequence of deterministic variations to consecutive transmissions of the data.

A further apparatus for wireless communication at a wireless device is described. The apparatus may include a processor, memory in electronic communication with the processor, and instructions stored in the memory, wherein the instructions are executable by the processor to identify a time domain bundling parameter of a user equipment (UE) that indicates redundant versions of a transmission are to be transmitted from the UE, determine that data is to be transmitted from the UE according to the time domain bundling parameter, identify a sequence of deterministic variations for use in transmitting the data, and apply the sequence of deterministic variations to consecutive transmissions of the data.

A non-transitory computer-readable medium storing code for wireless communication at a wireless device is described. The code may include instructions executable to identify a time domain bundling parameter of a user equipment (UE) that indicates redundant versions of a transmission are to be transmitted from the UE, determine that data is to be transmitted from the UE according to the time domain bundling parameter, identify a sequence of deterministic variations for use in transmitting the data, and apply the sequence of deterministic variations to consecutive transmissions of the data.

In some examples of the method, apparatuses, or non-transitory computer-readable medium described above, the sequence of deterministic variations comprise an ordered set of sequences. Additionally or alternatively, in some examples the ordered set of sequences comprise a repeated sequence that is scrambled in a deterministic fashion.

In some examples of the method, apparatuses, or non-transitory computer-readable medium described above, the identifying the sequence of deterministic variations may include selecting the ordered set of sequences from a plurality of available ordered sets of sequences based at least in part on one or both of a root sequence index or a shift index. In some examples, the ordered set of sequences may be modified according to a sequence hopping pattern, which may be based at least in part on one or both of a cell identification of a serving cell of the UE or an initial sequence index for the UE. Additionally or alternatively, the sequence hopping pattern may be signaled to the UE by a base station or the sequence hopping pattern may be a preset sequence hopping pattern.

In some examples of the method, apparatuses, or non-transitory computer-readable medium described above, the ordered set of sequences may include a plurality of sequences ordered according to a shift index and a root index. In some examples, the plurality of sequences are repeated in the ordered set of sequences. Additionally or alternatively, the ordered set of sequences are reordered according to a deterministic reordering procedure, or the ordered set of sequences are interleaved according to a predetermined interleaving pattern.

In some examples of the method, apparatuses, or non-transitory computer-readable medium described above, the ordered set of sequences are scrambled based at least in part on a root sequence and a transmissions cell identification. Additionally or alternatively, in some examples an order of sequences of the ordered set of sequences is selected based at least in part on one or more of a type of data to be transmitted or an expected interference for the transmissions.

In some examples of the method, apparatuses, or non-transitory computer-readable medium described above, an initial sequence of the ordered set of sequences is selected based at least in part on a cell identification of the UE. Additionally or alternatively, in some examples the sequence of deterministic variations is selected based at least in part on a number of redundant versions associated with the time domain bundling parameter.

In some examples of the method, apparatuses, or non-transitory computer-readable medium described above, the data is to be transmitted on a physical random access channel (PRACH). Additionally or alternatively, in some examples the sequence of deterministic variations comprises a Zadoff-Chu sequence.

In some examples of the method, apparatuses, or non-transitory computer-readable medium described above, the UE is a machine type communication (MTC) device.

A method of wireless communication at a wireless device is described. The method may include identifying a time domain bundling parameter to be used by a user equipment (UE) that indicates redundant versions of a transmission are to be transmitted from the UE, identifying a sequence of deterministic variations for use in transmitting data from the UE, receiving a sequence of transmissions from the UE, and applying the sequence of deterministic variations to decode the data transmitted in consecutive transmissions of the data.

An apparatus for wireless communication at a wireless device is described. The apparatus may include means for identifying a time domain bundling parameter to be used by a user equipment (UE) that indicates redundant versions of a transmission are to be transmitted from the UE, means for identifying a sequence of deterministic variations for use in transmitting data from the UE, means for receiving a sequence of transmissions from the UE, and means for applying the sequence of deterministic variations to decode the data transmitted in consecutive transmissions of the data.

A further apparatus for wireless communication at a wireless device is described. The apparatus may include a processor, memory in electronic communication with the processor, and instructions stored in the memory, wherein the instructions are executable by the processor to identify a time domain bundling parameter to be used by a user equipment (UE) that indicates redundant versions of a transmission are to be transmitted from the UE, identify a sequence of deterministic variations for use in transmitting data from the UE, receive a sequence of transmissions from the UE, and apply the sequence of deterministic variations to decode the data transmitted in consecutive transmissions of the data.

A non-transitory computer-readable medium storing code for wireless communication at a wireless device is described. The code may include instructions executable to identify a time domain bundling parameter to be used by a user equipment (UE) that indicates redundant versions of a transmission are to be transmitted from the UE, identify a sequence of deterministic variations for use in transmitting data from the UE, receive a sequence of transmissions from the UE, and apply the sequence of deterministic variations to decode the data transmitted in consecutive transmissions of the data.

In some examples of the method, apparatuses, or non-transitory computer-readable medium described above, the sequence of deterministic variations comprise an ordered set of sequences. Additionally or alternatively, in some examples the ordered set of sequences comprise a repeated sequence that is scrambled in a deterministic fashion.

In some examples of the method, apparatuses, or non-transitory computer-readable medium described above, the identifying the sequence of deterministic variations may include identifying the ordered set of sequences from a plurality of available ordered sets of sequences based at least in part on one or both of a root sequence index or a shift index. In some examples, a modified order of the ordered set of sequences may be determined based at least in part on a sequence hopping pattern. The sequence hopping pattern, in some examples, is based at least in part on one or both of a cell identification of a serving cell of the UE or an initial sequence index for the UE. In some examples the sequence hopping pattern to is signaled to the UE. In other examples, the sequence hopping pattern may be a preset sequence hopping pattern.

In some examples of the method, apparatuses, or non-transitory computer-readable medium described above, the ordered set of sequences may include a plurality of sequences ordered according to a shift index and a root index. In some examples, the plurality of sequences are repeated in the ordered set of sequences. In some examples, the ordered set of sequences are reordered according to a deterministic reordering procedure. Additionally or alternatively, the ordered set of sequences are interleaved according to a predetermined interleaving pattern.

In some examples of the method, apparatuses, or non-transitory computer-readable medium described above, the ordered set of sequences are scrambled based at least in part on a root sequence and a cell identification of the UE. Additionally or alternatively, in some examples an order of sequences of the ordered set of sequences is selected based at least in part on one or more of a type of data to be transmitted or an expected interference for the transmissions.

In some examples of the method, apparatuses, or non-transitory computer-readable medium described above, an initial sequence of the ordered set of sequences is selected based at least in part on a cell identification of the UE. Additionally or alternatively, in some examples the sequence of deterministic variations is selected based at least in part on a number of redundant versions associated with the time domain bundling parameter.

In some examples of the method, apparatuses, or non-transitory computer-readable medium described above, the sequence of transmissions is received on a physical random access channel (PRACH). Additionally or alternatively, in some examples the sequence of deterministic variations comprises a Zadoff-Chu sequence.

In some examples of the method, apparatuses, or non-transitory computer-readable medium described above, the UE is a machine type communication (MTC) device.

A method of wireless communication at a wireless device is described. The method may include transmitting a sequence of deterministic variations of random access data on at least one interlace of non-contiguous frequency resources allocated to a PRACH in an unlicensed spectrum, beginning at a first time. The method may also include repeating the transmitting of the sequence of deterministic variations of random access data at least once, beginning at a second time. The method may further include generating at least one modification of the sequence of deterministic variations of random access data, in which the at least one modification is generated according to a modification sequence, and transmitting on the at least one interlace, beginning at a third time, the at least one modification of the sequence of deterministic variations of random access data.

An apparatus for wireless communication at a wireless device is described. The apparatus may include means for transmitting a sequence of deterministic variations of random access data on at least one interlace of non-contiguous frequency resources allocated to a PRACH in an unlicensed spectrum, beginning at a first time. The apparatus may also include means for repeating the transmitting of the sequence of deterministic variations of random access data at least once, beginning at a second time. The apparatus may further include means for generating at least one modification of the sequence of deterministic variations of random access data, in which the at least one modification is generated according to a modification sequence, and means for transmitting on the at least one interlace, beginning at a third time, the at least one modification of the sequence of deterministic variations of random access data.

A further apparatus for wireless communication at a wireless device is described. The apparatus may include a processor, memory in electronic communication with the processor, and instructions stored in the memory, wherein the instructions are executable by the processor to transmit a sequence of deterministic variations of random access data on at least one interlace of non-contiguous frequency resources allocated to a PRACH in an unlicensed spectrum, beginning at a first time. The instructions may also be executable to repeat the transmitting of the sequence of deterministic variations of random access data at least once, beginning at a second time. The instructions may be further executable by the processor to generate at least one modification of the sequence of deterministic variations of random access data, in which the at least one modification is generated according to a modification sequence, and transmit on the at least one interlace, beginning at a third time, the at least one modification of the sequence of deterministic variations of random access data.

A non-transitory computer-readable medium storing code for wireless communication at a wireless device is described. The code may include instructions executable to transmit a sequence of deterministic variations of random access data on at least one interlace of non-contiguous frequency resources allocated to a PRACH in an unlicensed spectrum, beginning at a first time. The code may also include instructions executable by the processor to repeat the transmitting of the sequence of deterministic variations of random access data at least once, beginning at a second time. The code may further include instructions executable by the processor to generate at least one modification of the sequence of deterministic variations of random access data, in which the at least one modification is generated according to a modification sequence, and instructions executable by the processor to transmit on the at least one interlace, beginning at a third time, the at least one modification of the sequence of deterministic variations of random access data.

In some examples of the method, apparatuses, or non-transitory computer-readable medium described above, the transmissions on the at least one interlace may occur within a subframe, and the wireless device may refrain from transmitting, during a temporally last symbol period of the subframe, the sequence of deterministic variations of random access data or the at least one modification of the sequence of deterministic variations of random access data. In some examples, the wireless device may refrain from transmitting, on a set of edge tones of resource blocks in the at least one interlace of non-contiguous frequency resources, the sequence of deterministic variations of random access data or the at least one modification of the sequence of deterministic variations of random access data.

In some examples of the method, apparatuses, or non-transitory computer-readable medium described above, the wireless device may identify at least one comb of non-contiguous frequency resources within the at least one interlace of non-contiguous frequency resources, and the sequence of deterministic variations of random access data or the at least one modification of the sequence of deterministic variations of random access data may be transmitted on the at least one comb. In some examples, the wireless device may window at least one of: a temporally first transmission of the sequence of deterministic variations of random access data, a temporally first transmission of a modified sequence of deterministic variations of random access data, a temporally last transmission of a sequence of deterministic variations of random access data, or a temporally last transmission of a modified sequence of deterministic variations of random access data. In some examples, the wireless device may transmit second random access data on the at least one interlace, beginning at a fourth time, and the transmission of the sequence of deterministic variations of random access data, the transmission of the modified sequence of deterministic variations of random access data, and the transmission of the second random access data may be multiplexed within a subframe. In some examples, the random access data may include a random access preamble and the second random access data may include a radio resource control (RRC) connection request.

In some examples of the method, apparatuses, or non-transitory computer-readable medium described above, the wireless device may select an orthogonal cover code (OCC), and the modification sequence may be based at least in part on the selected OCC. In some examples, the first time, second time, and third time may occur in different transmission time intervals (TTIs). In some examples, the transmitting of the sequence of deterministic variations of random access data may be repeated two times, at two different times. In some examples, the at least one interlace of non-contiguous frequency resources may include two interlaces of non-contiguous frequency resources. In some examples, the method may include selecting the sequence of deterministic variations of random access data based at least in part on a root sequence index or a shift index. In some examples, the sequence of deterministic variations of random access data may be based at least in part on a Zadoff-Chu sequence.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
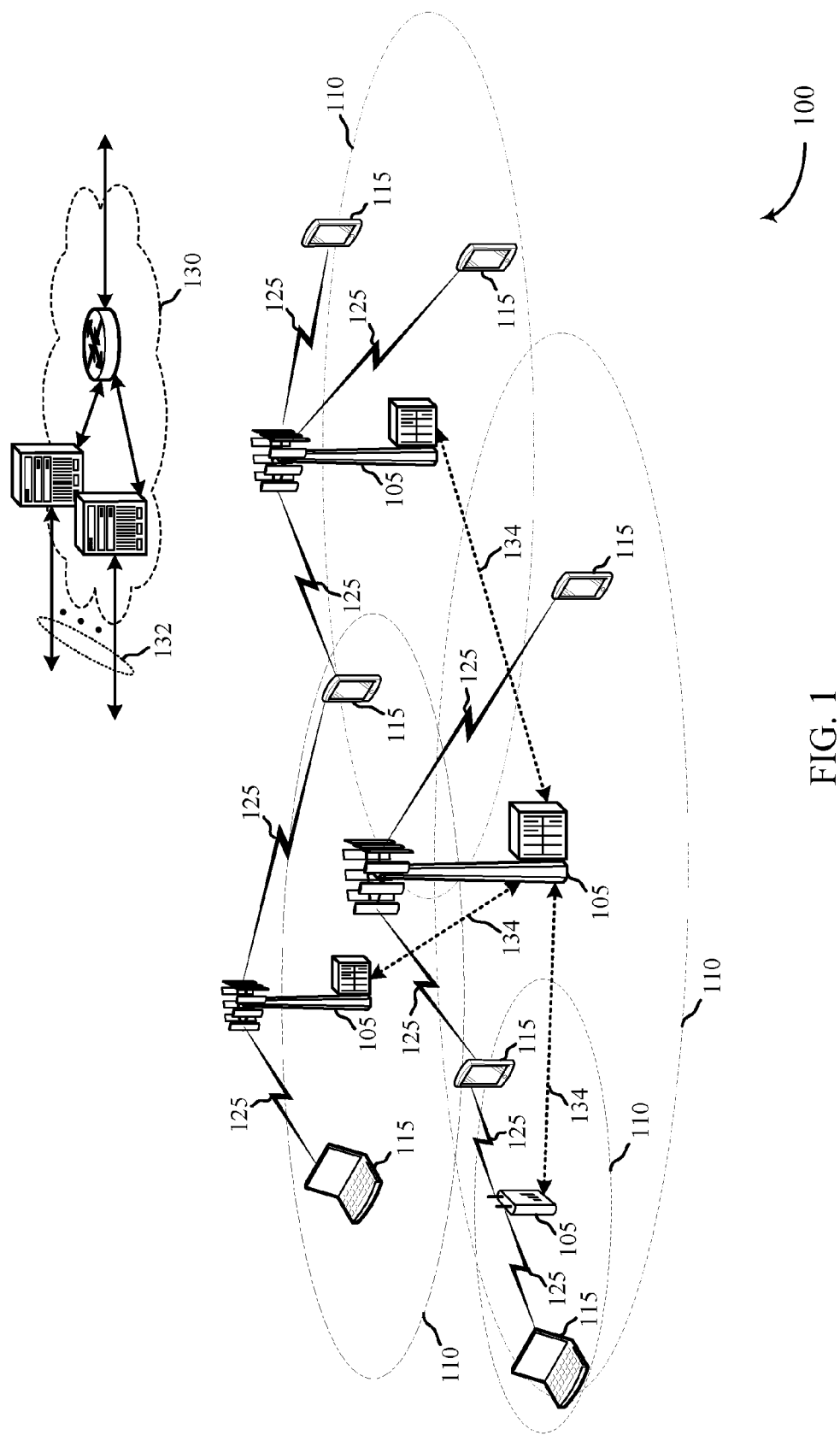
FIG. 1 illustrates an example of a wireless communication system for interference suppression in bundled transmissions for machine type communication (MTC) devices in accordance with various aspects of the present disclosure.

The described features generally relate to improved systems, methods, or apparatuses for interference suppression for Machine Type Communication (MTC) devices that may employ bundling to provide coverage enhancement, and to improved systems, methods, or apparatuses for performing a random access procedure in an unlicensed spectrum. Some wireless systems may provide for automated communication such as MTC or Machine-to-Machine (M2M) communication. M2M or MTC may refer to technologies that communicate without human intervention. In some cases, MTC devices may have limited capabilities. For example, while some MTC devices may have broadband capacity, other MTC devices may be limited to narrowband communications. This narrowband limitation may, for example, interfere with the ability of an MTC device to receive control channel information using the full bandwidth served by a base station. In some wireless communication systems, such as Long Term Evolution (LTE), an MTC device having limited bandwidth capability (or another device with similar capabilities) may be referred to as a category 0 device.

In some cases, MTC devices may have reduced peak data rates (e.g., a maximum transport block size may be 1000 bits). Additionally, an MTC device may have rank 1 transmission and one antenna for receiving. This may limit an MTC device to half-duplex communication (i.e., the device may not be capable of simultaneously transmitting and receiving). If an MTC device is half-duplex, it may have relaxed switching time (e.g., from transmission (Tx) to reception (Rx) or vice versa). For example, a nominal switching time for a non-MTC device may be 20 μs while a switching time for an MTC device may be 1 ms. MTC enhancements (eMTC) in a wireless system may allow narrowband MTC devices to effectively operate within wider system bandwidth operations (e.g., 1.4/3/5/10/15/20 MHz). For example, an MTC device may support 1.4 MHz bandwidth (i.e., 6 resources blocks). In some instances, coverage enhancements of such MTC devices may be employed to provide more reliable communications. Coverage enhancements may include, for example, power boosting (e.g., of up to 15 dB), and bundling of TTIs to provide redundant versions of a transmission. Bundling of TTIs may be used to enhance coverage for some channels, such as the physical uplink shared channel (PUSCH), the physical downlink shared channel (PDSCH), an enhanced PDCCH (ePDCCH), the physical random access channel (PRACH), and/or the physical uplink control channel (PUCCH).

For MTC devices with coverage enhancements that include bundling of TTIs, redundant versions of transmitted data may provide link level gain against thermal noise, but interference from other users may continue to be present. Thus, time domain bundling may provide an enhanced signal to noise ratio (SNR), but may not provide an enhanced signal to interference ratio (SIR). For example, consider the scenario when different users choose different root sequences to transmit bundled RACH transmissions. Regardless how long the bundle size is, the energy combining of the redundant versions of the RACH transmissions may suppress thermal noise, but the interfering channel may be combined in the same way as the desired channel, resulting in little, if any, interference suppression. Other channels may have similar properties.

For MTC devices with coverage enhancements that include time domain bundling, various aspects of the disclosure provide that a transmitting device may identify a sequence of deterministic variations for use in transmitting the data, and may apply the sequence of deterministic variations to consecutive transmissions of the data. A receiving device may also know the sequence of deterministic variations, and use the interference diversity to suppress interference from multiple devices that may be transmitting using the particular channel. For example, an ordered set of sequences may be used for a particular UE transmissions, with other UEs using a different ordered set of sequences or using the same ordered set of sequences but with an offset relative to other UEs, such that different sequences of the ordered set of sequences are transmitted by different UEs, which may provide interference diversity that may be used to suppress interference. The ordered sets of sequences may be determined, in some examples, by identifying an initial set of sequences and reordering the set of sequences according to a sequence hopping pattern. In some examples, data transmitted using time domain bundled resources to provide redundant versions of a transmission may be scrambled in order to provide interference diversity. Scrambling may be based on a root sequence and a cell identification of a transmitter, for example. In some examples, the sequence of deterministic variations may be a Zadoff-Chu (ZC) sequence that is used for PRACH transmissions.

Some wireless systems may provide for communication between base stations and UEs over an unlicensed spectrum. In some cases transmissions over the unlicensed spectrum (e.g., uplink transmissions) may be made over one or more interlaces of non-contiguous frequency resources. The techniques described above, and other techniques described in the present disclosure, may be used, for example, to improve timing estimation and timing advance, to reduce interference between transmissions related to a random access procedure and adjacent transmissions in time and/or frequency, or to increase capacity by providing multiple preamble sequences having minimal cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For example, although some scenarios are described with respect to MTC devices, the techniques described herein may be used with a variety of other type wireless communications devices and systems. In addition, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the present disclosure. The wireless communication system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. A UE may in some cases be an MTC device described above.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. As noted above, a UE may be an MTC device, although the techniques described herein may be used in a variety of systems. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

Some types of UEs may provide for automated communication. Automated wireless devices may include those implementing MTC or M2M communication. MTC may refer to data communication technologies that allow devices to communicate with one another or a base station without human intervention. For example, MTC may refer to communications from devices that integrate sensors or meters to measure or capture information and relay that information to a central server or application program that can make use of the information or present the information to humans interacting with the program or application. As noted, some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. In some cases, MTC devices may be configured for regular transmission intervals that alternate with sleep intervals.

The communication links 125 shown in wireless communication system 100 may include uplink (UL) transmissions from a UE 115 to a base station 105, or downlink (DL) transmissions, from a base station 105 to a UE 115. The downlink transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more UL CCs for carrier aggregation. Carrier aggregation may be used with both FDD and TDD component carriers.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Time intervals in LTE may be expressed in multiples of a basic time unit (e.g., the sampling period, $Ts=1/30,720,000$ seconds). Time resources may be organized according to radio frames of length of 10 ms ($Tf=307200 \cdot Ts$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

A resource element may include one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS) and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be for the UE.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and UL shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, PUCCH for control data, and physical UL shared channel (PUSCH) for user data.

In some cases a TTI (e.g., 1 ms in LTE, the equivalent of one subframe) may be defined as the smallest unit of time in which a base station 105 may schedule a UE 115 for UL or DL transmission. For example, if a UE 115 is receiving DL data, then during each 1 ms interval a base station 105 may assign resources and indicate (via PDCCH transmissions) to the UE 115 where to look for its DL data. TTI bundling may be used to improve a communication link 125 in relatively poor radio conditions or in deployments where MTC devices may operate using a relatively narrow bandwidth or are in a coverage limited locations, such as a basement or deep within a building. TTI bundling may involve sending multiple redundant copies of the same information in a group of consecutive or non-consecutive subframes (TTIs) rather than waiting for feedback indicating data was not received before retransmitting redundancy versions, as in typical hybrid automatic repeat request (HARQ) operation.

According to the present disclosure, and in some examples, a wireless device such as a UE 115 may be configured with a bundling parameter. The device may then identify one or more sequences of deterministic variations to be transmitted based on the TTI bundling parameter (e.g., using either an implicit or an explicit indication from another wireless node such as a serving cell of a base station 105) and transmit redundant versions of the data using the identified bundled resources. The device may also identify a scrambling format based on, for example, the TTI bundling parameter, a root sequence, or a cell ID of a transmission, or combinations thereof.

Further, according to the present disclosure, and in some examples, the wireless communication system 100 may support operation over a licensed spectrum (e.g., a radio frequency spectrum licensed to particular users for particular uses) or an unlicensed spectrum (e.g., a radio frequency spectrum that is available for Wi-Fi use, a radio frequency spectrum that is available for use by different radio access technologies, or a radio frequency spectrum that is available for use by multiple MNOs in an equally shared or prioritized manner).

Figure 2:
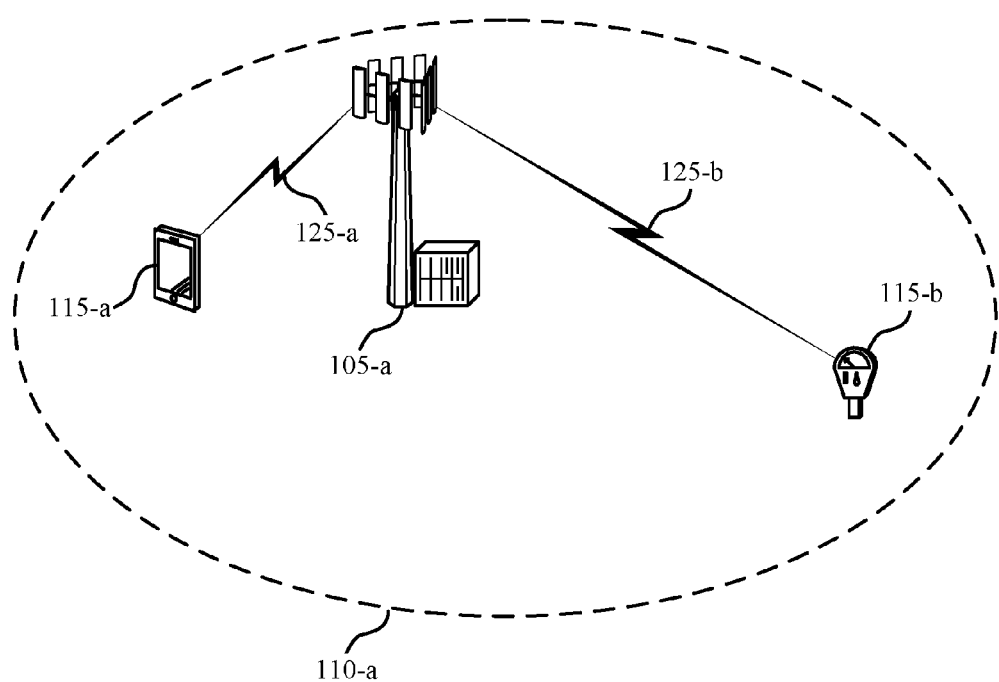
FIG. 2 illustrates an example of a wireless communications subsystem for MTC devices in accordance with various aspects of the present disclosure.

FIG. 2 illustrates an example of a wireless communication subsystem 200 for coverage enhancement in accordance with various aspects of the present disclosure. Wireless communication subsystem 200 may include UE 115-a and UE 115-b, which may be examples of a UE 115 described with reference to FIG. 1. In some examples, one or more of the UEs 115 may be an MTC device. For example, as illustrated, UE 115-b may be an MTC device. Wireless communication subsystem 200 may also include base station 105-a, which may be an example of a base station 105 described above with reference to FIG. 1. Base station 105-a may transmit control and data to any UE 115 within its geographic coverage area 110-a via a communication link 120. For example, communication link 125-a may allow for bidirectional communication between a UE 115-a and a base station 105-a, while communication link 125-b may provide for communication between UE 115-b and base station 105-a.

Wireless communication subsystem 200 may employ a hybrid automatic repeat request (HARM) feedback scheme to notify a transmitting entity (e.g., base station 105-a) of the reception status of transmitted subframes. Wireless communication subsystem 200 may also use coverage enhancements techniques (e.g., power boosting or time domain bundling), which may increase the robustness and reliability of communications for one or more UEs 115.

Wireless communication subsystem 200 may include UEs 115 with different capabilities and different communication environments. In some cases, a UE 115 may also be configured two or more levels of bundling or other coverage enhancements. In such cases, different UEs 115 may use different levels of bundling or other coverage enhancements. For example, UE 115-a may be located closer to base station 105-a and may have different radio capacity than UE 115-b, which may be an MTC device. UE 115-b may have a longer transmit path than UE 115-a, which may increase the level of signal attenuation or interference. Thus, UE 115-b may use a coverage enhancement level which differs from a coverage enhancement level used by UE 115-a. In some cases, base station 105-a may configure UE 115-b with a different bundling configuration from UE 115-a (e.g., a higher level of bundling). As mentioned above, multiple transmissions of redundant versions of a transmission may boost SNR, but not meaningfully boost SIR.

In some examples, a time domain bundling parameter may be identified for transmissions between a UE 115 and base station 105-a, and it may be determined that data is to be transmitted according to the bundling parameter. For example, if UE 115-b determines that a random access procedure is to be performed, the UE 115-b may transmit a same PRACH signal, excluding a cyclical prefix (CP), repeatedly for r number of transmissions, where r is defined by the time domain bundling parameter. The PRACH signal may include a sequence of data bits in a PRACH preamble, which may be a Zadoff-Chu (ZC) sequence, according to established PRACH procedures. The PRACH preamble may be determined based on a root ZC sequence, according to established procedures. If both UE 115-a and UE 115-b attempt a PRACH procedure interference may be present in the PRACH transmissions. Such interference may be present when UE 115-a and UE 115-b have different ZC roots, or may be present when UE 115-a and UE 115-b have the same ZC root (e.g., the PRACH procedure utilized frequency offsets). Thus, even when transmitting according to the time domain bundling parameter, interference may dominate a signal received at base station 105-a.

In other examples, an enhanced PRACH (ePRACH) may be provided by base station 105-a with each ePRACH resource block allowing M sequences (e.g., 1, 2, 4, or 8 ZC sequences). Each ePRACH resource block may have a CP inserted at the beginning of the resource block to allow a receiver to handle multipath delay spread for each repetition. A time domain bundling parameter in such examples may identify a number of redundant versions of each burst of M sequences.

Figure 3A:
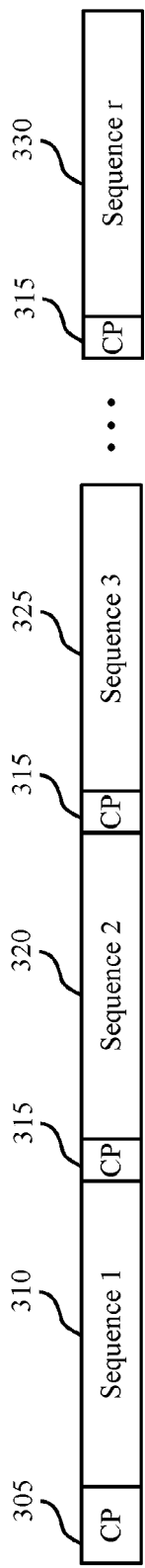
FIG. 3A illustrates an example of a sequence of deterministic variations for data transmissions of a device in accordance with various aspects of the present disclosure.

According to some examples, the sequence that is transmitted in each consecutive redundant version of the transmission may be varied according to a predetermined scheme. FIG. 3A illustrates an example of a sequence of deterministic variations 300 for data transmissions of devices in accordance with various aspects of the present disclosure. The sequence of deterministic variations 300 may be used by a UE 115 and a base station 105 as described with reference to FIGS. 1-2. The sequence of deterministic variations 300 may include transmission of an initial CP 305, followed by a first sequence 310 of an ordered sequence of deterministic variations. For example, an ordered sequence of deterministic variations may be identified, and the first sequence 310 may include a PRACH preamble including a ZC sequence that may be determined according to established PRACH techniques. The second transmission 320 may include a next consecutive ZC sequence in the ordered sequence, preceded by CP 315. A third transmission 325 may include a next consecutive ZC sequence preceded by CP 315, and so on until sequence r 330 is transmitted, where r corresponds to the number of transmissions identified by the time domain bundling parameter. Depending upon the number of variations in the ordered sequence, and the number of redundant versions of the transmission according to the bundling parameter, an ordered sequence may be repeated one or more times. So long as transmitting devices (e.g., UE 115-a and UE 115-b of FIG. 2) do not start at the same sequence in the ordered sequence, interference diversity is present between signals of different UEs, and a SINR for the transmissions is enhanced.

Figure 3B:
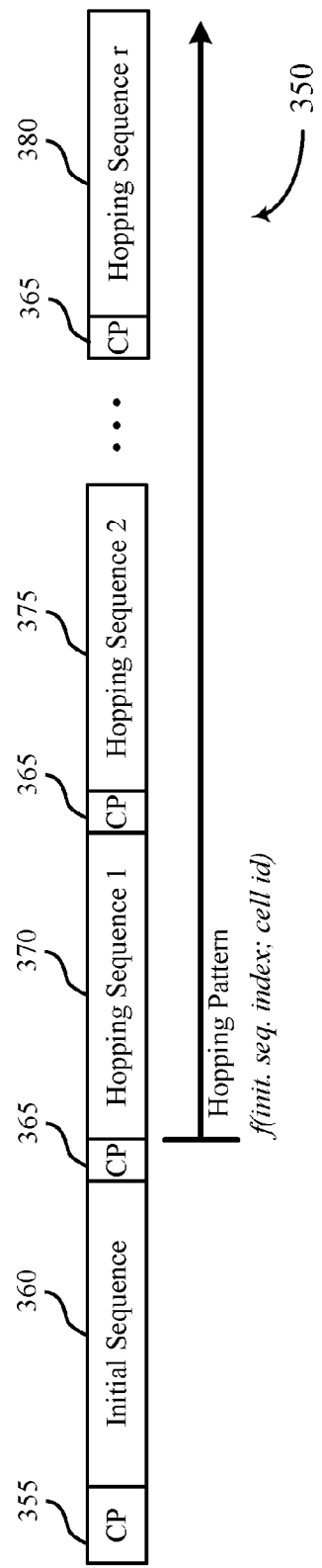
FIG. 3B illustrates an example of a sequence hopping pattern applied to an ordered set of sequences to provide a deterministic variation of the ordered set of sequences for data transmissions of a device in accordance with various aspects of the present disclosure.

FIG. 3B illustrates an example of a sequence hopping pattern applied to an ordered set of sequences to provide a deterministic variation of the ordered set of sequences 350 for data transmissions of a device in accordance with various aspects of the present disclosure. The sequence hopping pattern applied to the ordered set of sequences may be used by a UE 115 and a base station 105 as described with reference to FIGS. 1-2. The deterministic variation of the ordered set of sequences 350 may include transmission of an initial CP 355, followed by an initial sequence 360. The initial sequence may be identified based at least in part on a root sequence index, a shift index, or combinations thereof.

The root sequence index may be identified, for example, based on an initial sequence (e.g., a ZC sequence) determined according to established PRACH techniques. The shift index may be identified, for example, based on a type of data to be transmitted or an expected interference for the transmissions (e.g., potential inter-cell interference). Based on the root sequence index and/or the shift index, a sequence hopping pattern may be identified. In some examples, a predetermined sequence hopping pattern may be set in each cell for bundled transmissions. Such a hopping pattern may be signaled to a UE by a base station, or may be set in a specification that defines various aspects of communication between a UE and a base station. In some examples, the sequence hopping pattern may be a function of a cell identification of a serving cell of a UE, and different hopping patterns may be used to randomize inter-cell interference. Additionally or alternatively, the sequence hopping pattern may be a function of the initial sequence index, and may randomize intra-cell interference as long as the initial sequence is different between different UEs.

The second transmission 370 may include a first hopping sequence in the ordered sequence as modified by the sequence hopping pattern, preceded by CP 365. A third transmission 375 may include a second hopping sequence preceded by CP 365, and so on, until hopping sequence r 380 is transmitted, where r corresponds to the number of transmissions identified by the time domain bundling parameter. So long as transmitting devices (e.g., UE 115-a and UE 115-b of FIG. 2) do not start at the same sequence in the ordered sequence, interference diversity is present between signals of different UEs, and a SINR for the transmissions may be enhanced.

In some examples, there may be up to 64 sequences per cell, which may have an initial order that may be set, for example, according to a shift index first and a root index. The ordered sequences may then be reordered to provide interference diversity among different transmissions by different UEs, such as according to a sequence hopping pattern as discussed above. The different reordered sequences may be stored and mapped to particular initial sequences and shift indexes, or the reordering of the sequences may be deterministic such that the reordered sequences may be determined based on an initial sequence index and/or a shift index. For example, one ZC sequence set may be ordered differently for different purposes (e.g., based on cell id to handle potential inter-cell interference or based on data type to handle potential intra-cell interference). In some examples, the reordering of sequences may be achieved with a predetermined interleaver, with different interleavers for different cells.

Figure 4A:
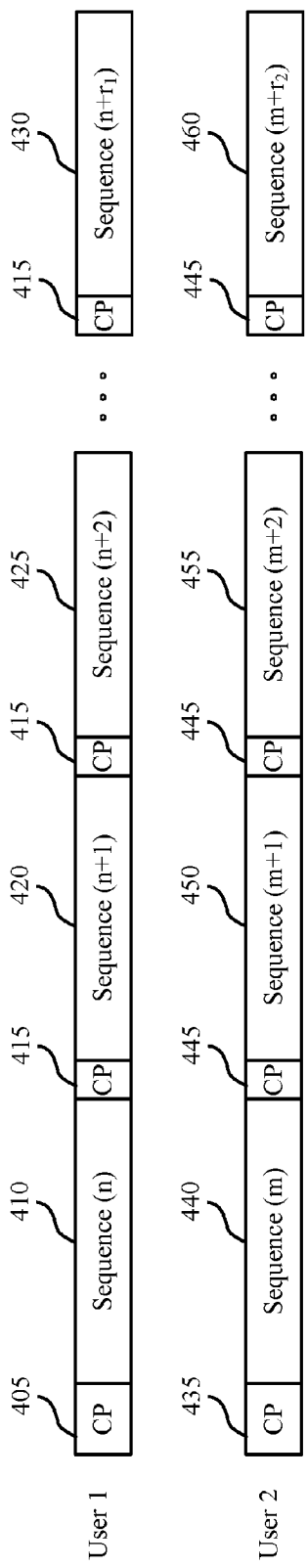
FIG. 4A illustrates an example of sequences of deterministic variations of multiple devices in accordance with various aspects of the present disclosure.

FIG. 4A illustrates an example of transmission of an ordered set of sequences 400 by multiple devices in accordance with various aspects of the present disclosure. In this example, different users, user 1 and user 2, transmit offset sequences in an ordered set of sequences in multiple transmissions according to a time domain bundling parameter. The ordered set of sequences 400 may be used by multiple UEs 115 and a base station 105 as described with reference to FIGS. 1-3. The transmissions for user 1 may include transmission of an initial CP 405, followed by a first sequence 410, second sequence 420, third sequence 425, and so on up to final sequence 430. Following the first sequence 410, a CP 415 may be transmitted ahead of each subsequent sequence 420-430. In the example of FIG. 4A, the sequences transmitted by user 1 may be offset by a value n, such that the first sequence 410 corresponds to sequence n of the ordered set of sequences. For example, an ordered set of sequences of deterministic variations may be identified as an ordered set of ZC sequences for use in PRACH preambles that may be reordered as discussed above. The first sequence 410 may include a PRACH preamble including a ZC sequence that may start with sequence n of the ordered set of sequences. The second sequence 420 be sequence n+1, and so on until sequence n+$r_1$, where r is the number of transmissions indicated by the time domain bundling parameter.

Likewise, user 2 may transmit an initial CP 435, followed by a first sequence 440, second sequence 450, third sequence 455, and so on up to final sequence 460. Following the first sequence 440, a CP 445 may be transmitted ahead of each subsequent sequence 450-460. In the example of FIG. 4A, the sequences transmitted by user 2 may be offset by a value m, such that the first sequence 440 corresponds to sequence m of the ordered set of sequences. The second sequence 450 be sequence m+1, and so on until sequence m+$r_1$, where r is the number of transmissions indicated by the time domain bundling parameter.

Figure 4B:
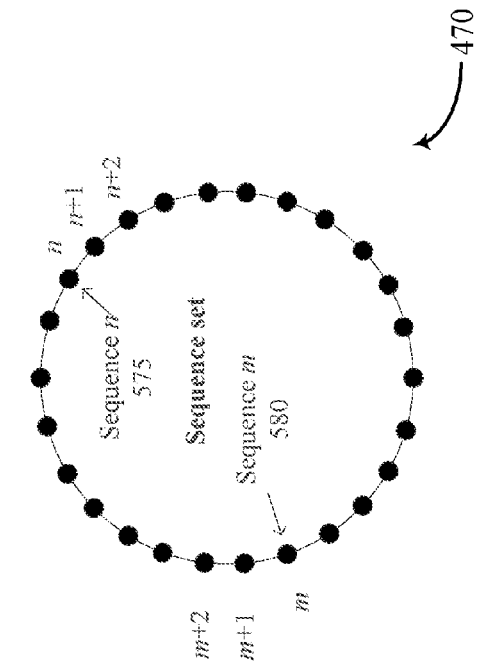
FIG. 4B illustrates an example of a repeating set of ordered sequences for devices in accordance with various aspects of the present disclosure.

FIG. 4B illustrates an ordered set of sequences 470 in which the sequences in the set are ordered to form an "endless" circle. The order is deterministic, with sequence n 575 associated with user 1 and sequence m associated with user 2 starting at different initial positions within the ordered set of sequences 470. The order of sequences of the ordered set of sequences 470 may be selected based at least in part on one or more of a type of data to be transmitted or an expected interference for the transmissions, according to some examples. In some examples, the initial sequence of the ordered set of sequences 470 may be selected based on, for example, a cell identification of the UE, which may be reordered in a manner such as described with respect to FIG. 3B. In this manner, different UEs may be less likely to have a same starting sequence, and thus the likelihood of interference diversity between UEs is enhanced. In some examples, the reordering applied to an initial order of sequenced to identify the set of sequences 470 is selected based at least in part on a number of redundant versions associated with the time domain bundling parameter. For example, different reordering patterns (e.g., different sequence hopping patterns) may be applied to generate different sets of sequences, with a particular set selected based on the time domain bundling parameter. When a receiver (e.g., a base station 105 of FIG. 1 or 2) receives transmissions from UEs, the transmissions may be decoded by applying the sequence of deterministic variations to decode the data transmitted in consecutive transmissions of the data. The receiver may use the deterministic variations to enhance a SIR for multiple received transmissions.

Figure 5:
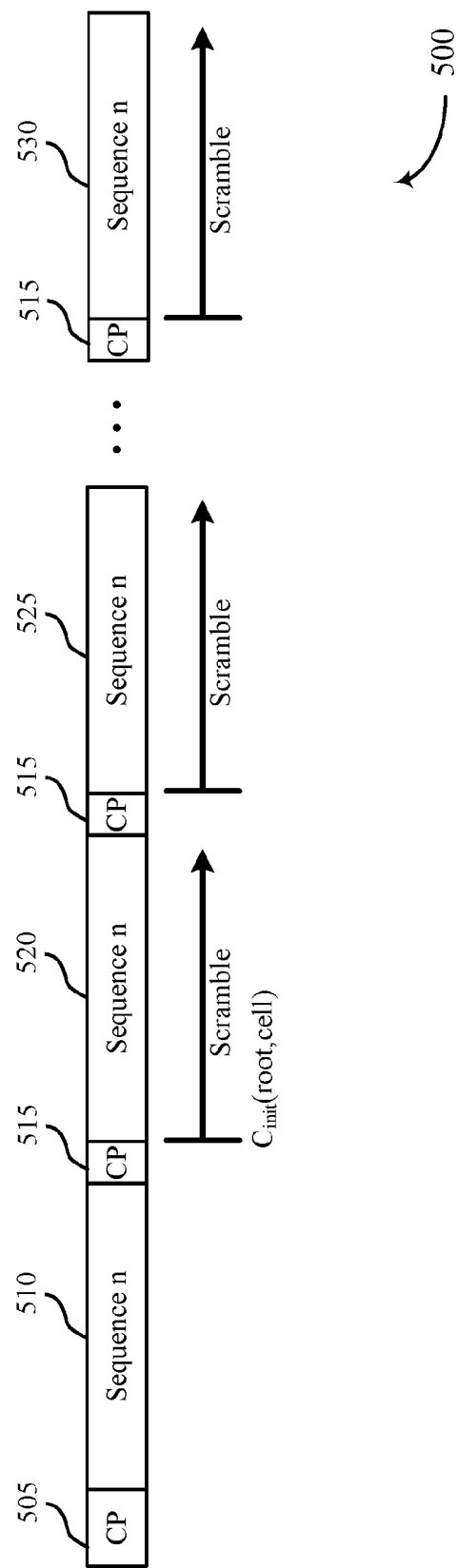
FIG. 5 illustrates an example of scrambling of a repeated sequence in accordance with various aspects of the present disclosure.

FIG. 5 illustrates an example of transmission of an ordered set of sequences 500 by a device in accordance with various aspects of the present disclosure. In this example, a signal sequence, sequence n, may be retransmitted a number of times, with successive transmissions scrambled in a deterministic fashion. The ordered set of sequences 500 may be used by a UE 115 and a base station 105 as described with reference to FIGS. 1-4. The sequence of deterministic variations may include transmission of an initial CP 505, followed by a first sequence 510. For example, first sequence 510 may include a PRACH preamble including a ZC sequence (sequence n) that may be determined according to established PRACH techniques. The second transmission 520 may include the same ZC sequence (sequence n), and may be scrambled in a deterministic fashion. The scrambling may be based on a function ($C_{init}$) of the root sequence and a cell ID, for example. A third transmission 525 may include the same ZC sequence scrambled according to the determined scrambling function, and so on until transmission 530. Such scrambling of transmissions may reduce the likelihood of multiple user interference. Essentially, such a technique may apply a pseudo random scrambling to consecutive transmissions that may be decoded at a receiver to enhance interference diversity. A pseudorandom number (PN) generator, also known as a deterministic random bit generator, may be used to perform the scrambling. For example, an algorithm may be used for generating a sequence of numbers whose properties approximate the properties of sequences of random numbers. The sequence is not truly random, because it is completely determined by initial values, called seed values.

In some examples, different scrambling may be used for different cells, and the scrambling can be a function of cell ID, for example, in order to further reduce the likelihood of inter-cell interference. In other examples, different cycling sequences may be applied to different cells, such as a function of cell ID, which also may reduce the likelihood of inter-cell interference. In still further examples, different cells may use different sets of ordered sequences, which also may reduce the likelihood of inter-cell interference. In some examples, different users may have different time domain bundling sizes. As discussed above, bundling parameters may be based on an amount of coverage enhancement needed for particular UEs, for example. In some cases, if bundling sizes are integer multiples of each other, sets of ordered sequences may collide. In some examples, such a situation may be avoided by providing different sequence spreading based on time domain bundle sizes, or having different sequence cycling for different bundle sizes. For example, if sequence spreading is utilized, different time domain bundle sizes may skip one or more sequences of available ZC sequences (e.g., a time domain bundle with 64 repetitions may use sequences in order of n through n+63, and a time domain bundle with 16 repetitions may use every other sequence in order of n through n+30). If different sequence cycling is utilized, an order for the different bundle sizes may be selected to be different (e.g., a time domain bundle with 64 repetitions may use sequences in order of 0 through 63, and a time domain bundle with 16 repetitions may use sequences in order of 15 through 0). In either case, interference diversity may be maintained because even in the event bundle sizes of integer multiples are encountered, the ordered sets of sequences would be different.

While the examples of FIGS. 3-5 are described with respect to PRACH transmissions, the concepts described herein may be applied to other channels as well. For example, other channels, such as the PUSCH for example, may use different sequences within redundant transmissions of a time domain bundle, may use different scrambling for redundant transmissions of a time domain bundle, or may apply Walsh cover spreading across redundant transmissions of a time domain bundle.

Figure 6:
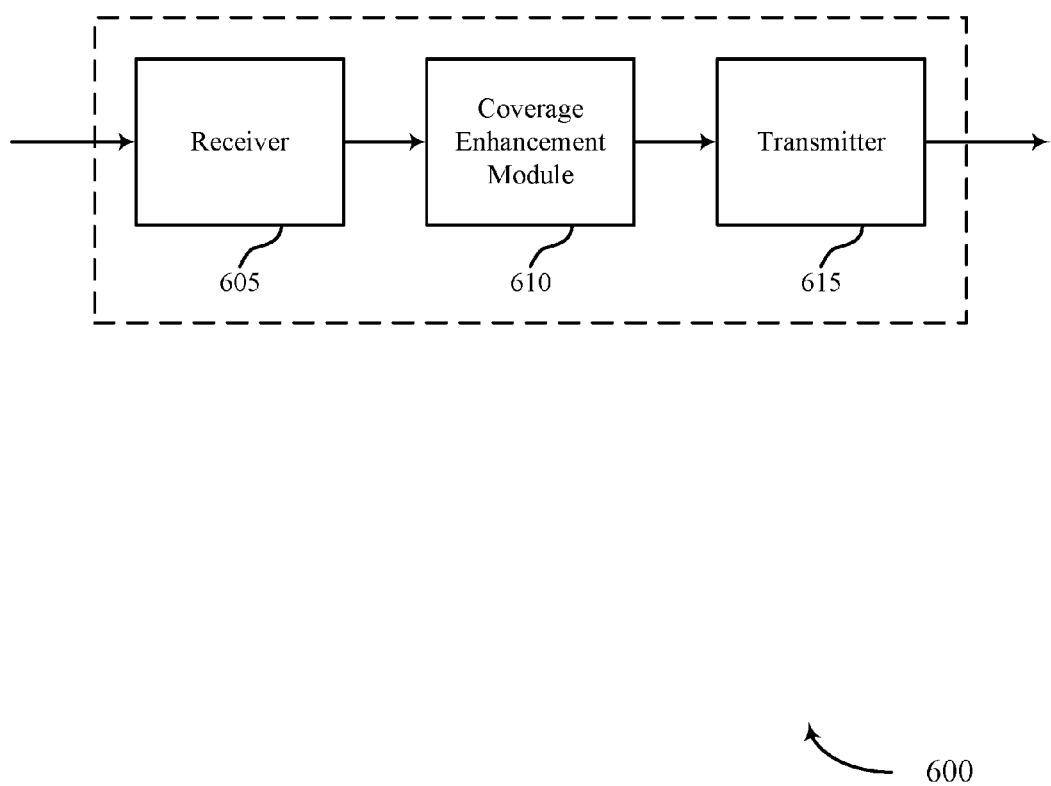
FIG. 6 shows a block diagram of a device configured for coverage enhancement in accordance with various aspects of the present disclosure.

FIG. 6 shows a block diagram of a wireless device 600 configured for coverage enhancement in accordance with various aspects of the present disclosure. Wireless device 600 may be an example of aspects of a UE 115 or a base station 105 described with reference to FIGS. 1-5. Wireless device 600 may include a receiver 605, a coverage enhancement module 610, or a transmitter 615. Wireless device 600 may also include a processor. Each of these components may be in communication with each other.

The components of wireless device 600 may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 605 may receive information such as packets, user data, or control information associated with various information channels (e.g., control channels, data channels, and information related to coverage enhancement or time domain bundling for MTC devices, etc.). Information may be passed on to the coverage enhancement module 610, and to other components of wireless device 600. In some examples, the receiver 605 may receive redundant transmissions from a transmitter using the one or more resources (e.g., a base station 105 may receive time domain bundled PRACH transmissions). In some examples, the receiver 605 may receive a configuration for an ordered set of sequences to be used with redundant versions of a transmission (e.g., a UE 115 may receive the configuration in a DL control channel). In some examples, the receiver 605 may receive scrambling criteria for redundant versions of a transmission. In some examples, the receiver 605 may receive a time domain bundling parameter that indicates redundant versions of a transmission are to be transmitted.

The coverage enhancement module 610 may identify a sequence of deterministic variations for use in transmitting the data. In some examples, identifying the sequence of deterministic variations comprises receiving an indication of an ordered set of sequences from a wireless node.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas. In some examples, the transmitter 615 may transmit redundant versions of a transmission according to a time domain bundling parameter (e.g., a UE 115 may transmit sequences on a PRACH). In some examples, the transmitter 615 may transmit configuration information for use in identifying a sequence of deterministic variations for use in transmitting the data (e.g., a base station 105 may transmit configuration information to a UE 115).

Figure 7:
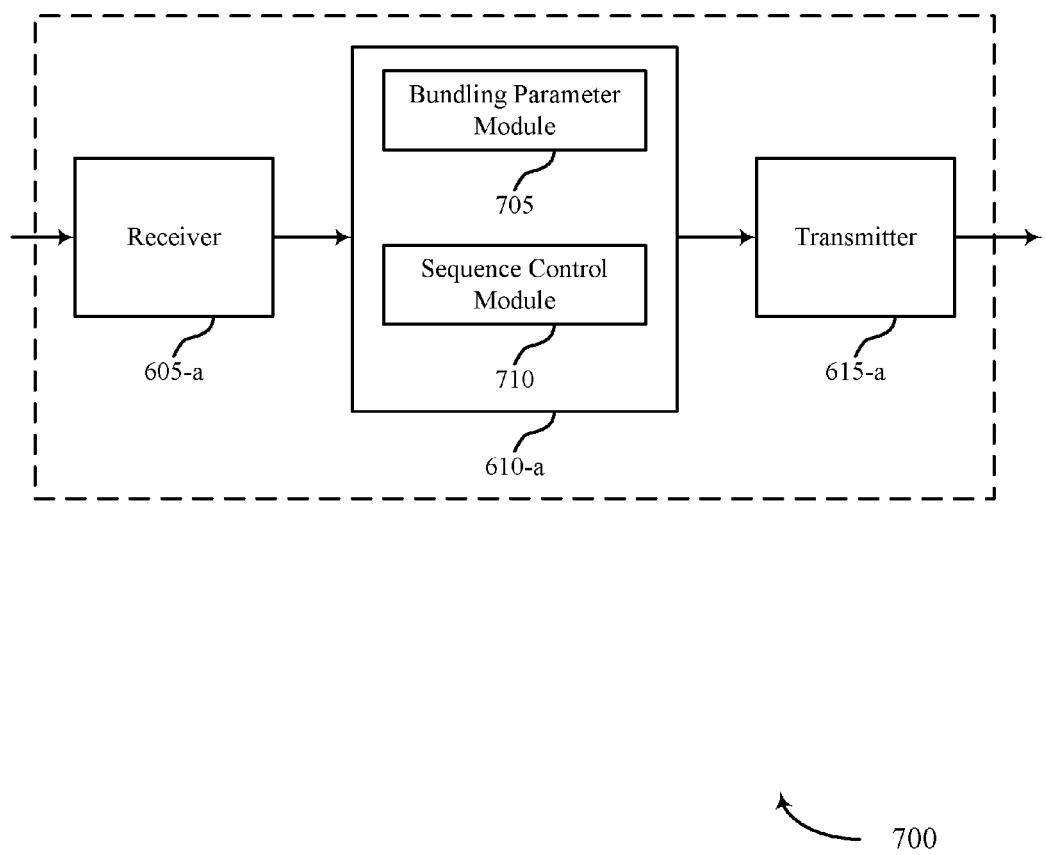
FIG. 7 shows a block diagram of another device configured for coverage enhancement in accordance with various aspects of the present disclosure.

FIG. 7 shows a block diagram of a wireless device 700 for coverage enhancement in accordance with various aspects of the present disclosure. Wireless device 700 may be an example of aspects of a wireless device 600 described with reference to FIGS. 1-6 (e.g., it may represent a UE 115 or a base station 105). Wireless device 700 may include a receiver 605-*a*, a coverage enhancement module 610-*a*, or a transmitter 615-*a*. Wireless device 700 may also include a processor. Each of these components may be in communication with each other. The coverage enhancement module 610-*a* may also include a bundling parameter module 705, and a sequence control module 710.

The components of wireless device 700 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to coverage enhancement module 610-*a*, and to other components of wireless device 700. The coverage enhancement module 610-*a* may perform the operations described above with reference to FIG. 6. The transmitter 615-*a* may transmit signals received from other components of wireless device 700.

The bundling parameter module 705 may identify a time domain bundling parameter of a wireless device as described above with reference to FIGS. 1-5. In some cases, the bundling parameter module 705 may determine a number of redundant transmissions to be used for coverage enhancement.

The sequence control module 710 may identify one or more resources for an UL control channel based at least in part on the TTI bundling parameter identify a sequence of deterministic variations for use in transmitting the data, and apply the sequence of deterministic variations to consecutive transmissions of the data as described above with reference to FIGS. 1-5.

Figure 8:
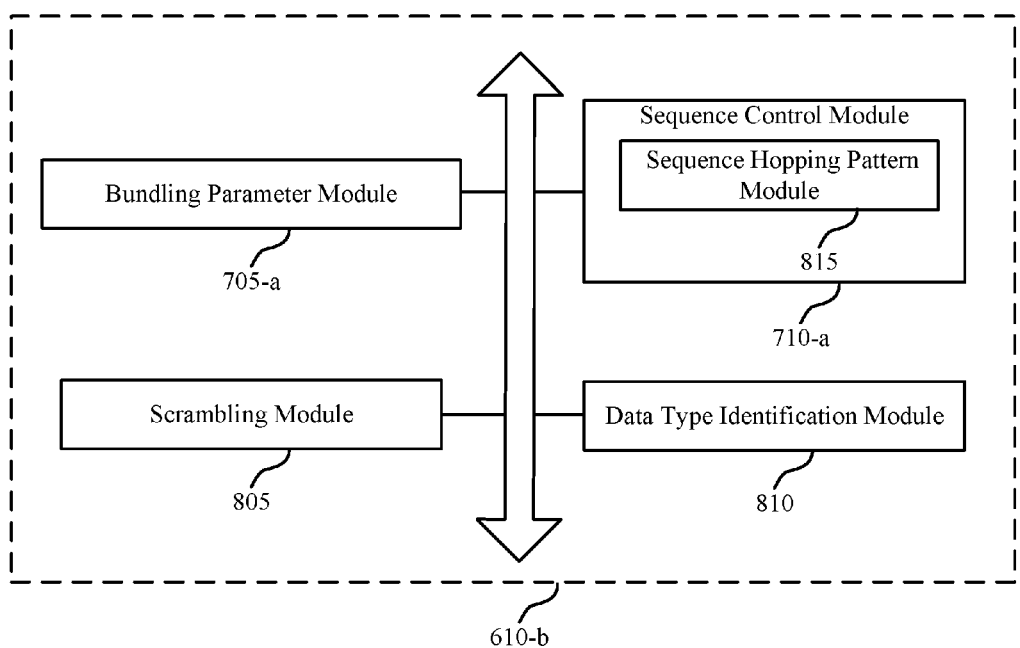
FIG. 8 shows a block diagram of a coverage enhancement module for a device in accordance with various aspects of the present disclosure.

FIG. 8 shows a block diagram of a coverage enhancement module 610-*b* for coverage enhancement in accordance with various aspects of the present disclosure. The coverage enhancement module 610-*b* may be an example of aspects of a coverage enhancement module 610 described with reference to FIGS. 6-7. The coverage enhancement module 610-*b* may include a bundling parameter module 705-*a*, and a sequence control module 710-*a*. Each of these modules may perform the functions described above with reference to FIG. 7. The coverage enhancement module 610-*b* may also include a scrambling module 805, and a data type identification module 810. The sequence control module 710-*a* may also include a sequence hopping pattern module 815.

The components of the coverage enhancement module 610-*b* may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The scrambling module 805 may be configured to provide scrambling to one or more redundant transmissions as described above with reference to FIGS. 1-5. In some examples, scrambling may be based on a root sequence of a transmission and a cell ID of the transmission.

The data type identification module 810 may be configured to identify a type of date to be transmitted, and may provide information on the type of data to other modules to determine, for example, an ordered set of sequences or scrambling functions that are to be applied to redundant transmissions, as described above with reference to FIGS. 1-5.

In some examples, the sequence control module 710-*a* may be configured to select an ordered set of sequences from a plurality of available ordered sets of sequences based at least in part on one or both of a root sequence index or a shift index. The sequence hopping pattern module 815 may be configured to modify the ordered set of sequences according to a sequence hopping pattern. Such a sequence hopping pattern may be based at least in part on one or both of a cell identification of a serving cell of a UE or an initial sequence index for the UE. In some examples, the sequence hopping pattern may be signaled by a base station, or may be a preset pattern defined in a wireless communication specification or standard. The modified ordered set of sequences may be achieved, in some examples, through an interleaver such that the ordered set of sequences are interleaved according to a predetermined interleaving pattern (e.g., a sequence hopping pattern identified by sequence hopping pattern module 815).

Figure 9:
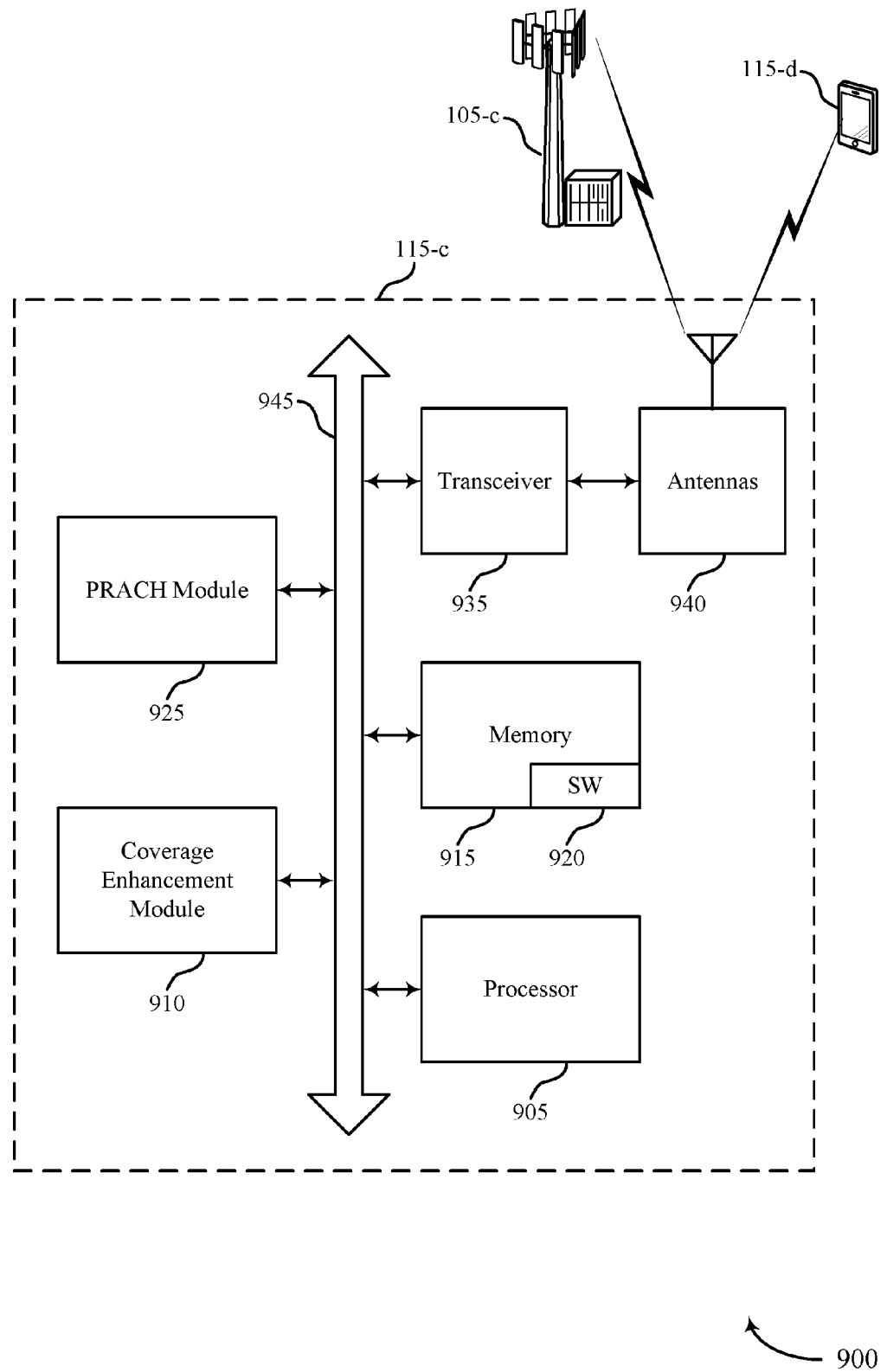
FIG. 9 illustrates a block diagram of a system including a device configured for coverage enhancement in accordance with various aspects of the present disclosure.

FIG. 9 shows a diagram of a system 900 including a UE 115 configured for coverage enhancement in accordance with various aspects of the present disclosure. System 900 may include UE 115-*c*, which may be an example of a UE 115, a wireless device 600 or a wireless device 700 described above with reference to FIGS. 1-8. UE 115-*c* may include a coverage enhancement module 910, which may be an example of a coverage enhancement module 610 described with reference to FIGS. 6-8. UE 115-*d* may also include a PRACH module 925, that may perform operations related to random access procedures described above with reference to FIGS. 1-5, or below with reference to FIGS. 17-22. UE 115-*c* may also include components for bi-directional voice and data communications including components for transmitting communications and components for receiving communications. For example, UE 115-*c* may communicate bi-directionally with UE 115-*e* or base station 105-*c*.

The coverage enhancement module 910 may be configured such that the time domain bundling parameter may be based at least in part on a coverage enhancement setting of the device as described above with reference to FIGS. 1-5. In some examples, the device may be an MTC device.

UE 115-*c* may also include a processor module 905, and memory 915 (including software (SW)) 920, a transceiver module 935, and one or more antenna(s) 940, each of which may communicate, directly or indirectly, with one another (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-*d* may include a single antenna 940, UE 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., coverage enhancement for MTC devices, etc.). Alternatively, the computer-executable software/firmware code 920 may not be directly executable by the processor module 905 but cause a computer (e.g., when compiled and executed) to perform functions described herein. The processor module 905 may include an intelligent hardware device, (e.g., a central processing unit (CPU), a microcontroller, an ASIC, etc.)

Figure 10:
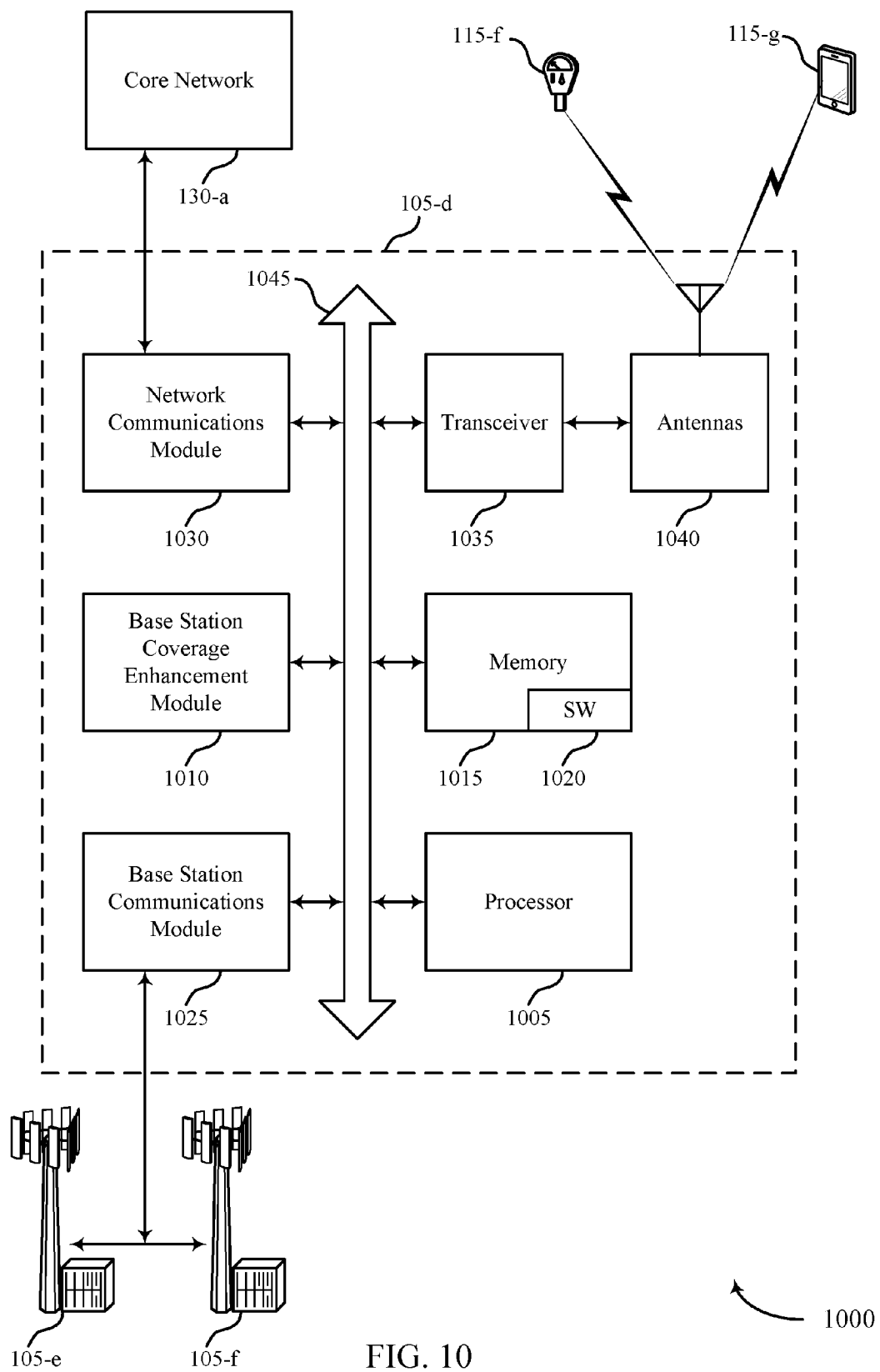
FIG. 10 illustrates a block diagram of a system including a base station configured for coverage enhancement in accordance with various aspects of the present disclosure.

FIG. 10 shows a diagram of a system 1000 including a base station 105 configured for coverage enhancement and/or receipt of random access data in accordance with various aspects of the present disclosure. System 1000 may include base station 105-*d*, which may be an example of a wireless device 600, a wireless device 700, or a base station 105 as described above with reference to FIGS. 1-8. Base Station 105-*d* may include a base station coverage enhancement module 1010, which may be an example of a coverage enhancement module 610 described with reference to FIGS. 6-8. Base Station 105-*d* may also include components for bi-directional voice and data communications including components for transmitting communications and components for receiving communications. For example, base station 105-*d* may communicate bi-directionally with UE 115-*f* (which may be an MTC device) or UE 115-*g*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*d* or 105-*d* utilizing base station communication module 1025. In some examples, base station communication module 1025 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130 through network communications module 1030.

The base station 105-*d* may include a processor module 1005, memory 1015 (including software (SW) 1020), transceiver modules 1035, and antenna(s) 1040, which each may be in communication, directly or indirectly, with one another (e.g., over bus system 1045). The transceiver modules 1035 may be configured to communicate bi-directionally, via the antenna(s) 1040, with the UEs 115, which may be multi-mode devices. The transceiver module 1035 (or other components of the base station 105-*d*) may also be configured to communicate bi-directionally, via the antennas 1040, with one or more other base stations (not shown). The transceiver module 1035 may include a modem configured to modulate the packets and provide the modulated packets to the antennas 1040 for transmission, and to demodulate packets received from the antennas 1040. Base station 105-*d* may include multiple transceiver modules 1035, each with one or more associated antennas 1040. The transceiver module may be an example of a combined receiver 605 and transmitter 615 of FIG. 6.

The memory 1015 may include RAM and ROM. The memory 1015 may also store computer-readable, computer-executable software/firmware code 1020 containing instructions that are configured to, when executed, cause the processor module 1010 to perform various functions described herein (e.g., coverage enhancement for MTC devices, selecting coverage enhancement techniques, facilitating random access procedures, call processing, database management, message routing, etc.). Alternatively, the computer-executable software/firmware code 1020 may not be directly executable by the processor module 1005 but be configured to cause the computer, e.g., when compiled and executed, to perform functions described herein. The processor module 1005 may include an intelligent hardware device, e.g., a CPU, a microcontroller, an ASIC, etc. The processor module 1005 may include various special purpose processors such as encoders, queue processing modules, base band processors, radio head controllers, digital signal processor (DSPs), and the like.

The base station communication module 1025 may manage communications with other base stations 105. The communications management module may include a controller or scheduler for controlling communications with UEs 115 in cooperation with other base stations 105. For example, the base station communication module 1025 may coordinate scheduling for transmissions to UEs 115 for various interference mitigation techniques such as beamforming or joint transmission.

Figure 11:
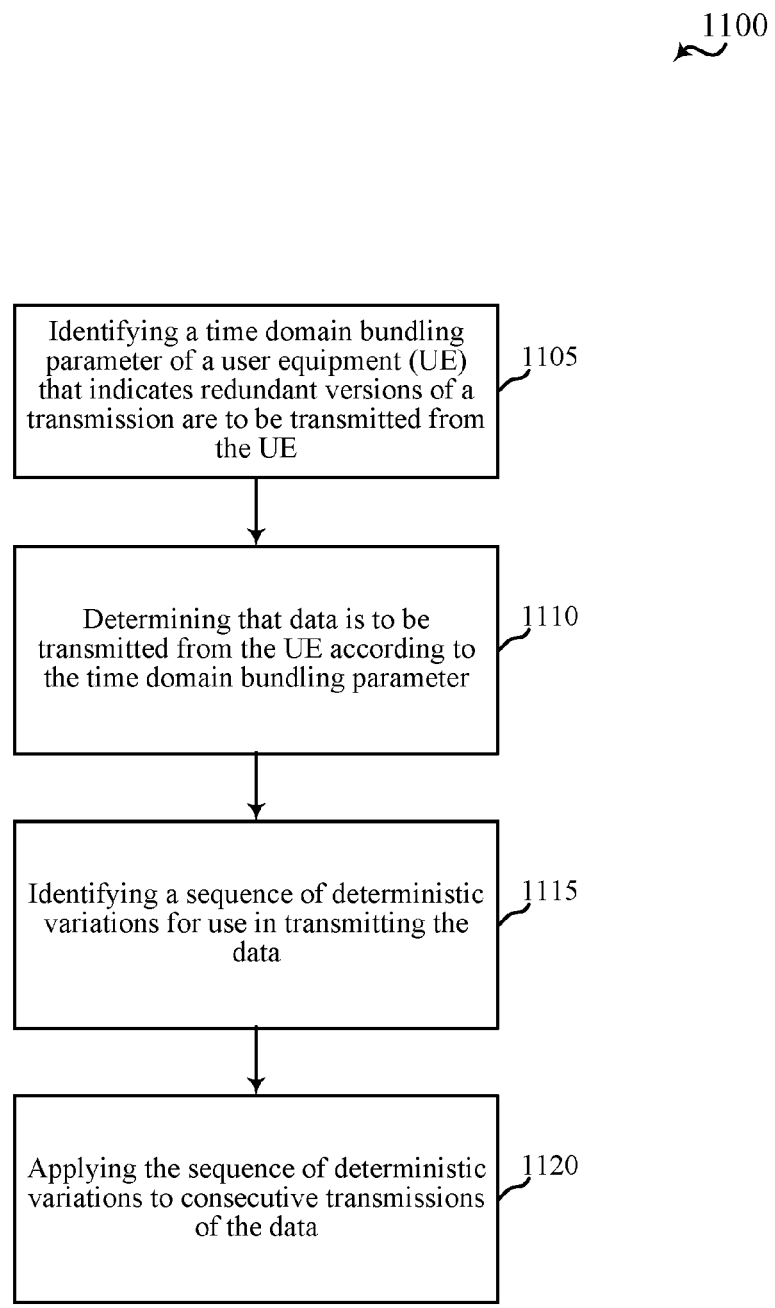
FIG. 11 shows a flowchart illustrating a method for communication with coverage enhancement in accordance with various aspects of the present disclosure.

FIG. 11 shows a flowchart illustrating a method 1100 for coverage enhancement in accordance with various aspects of the present disclosure. The operations of method 1100 may be implemented by a wireless device (e.g., a UE 115, a wireless device 600 or a wireless device 700) or its components as described with reference to FIGS. 1-10. For example, the operations of method 1100 may be performed by the coverage enhancement module 610 as described with reference to FIGS. 6-8. In some examples, a wireless device may execute a set of codes to control the functional elements of the wireless device to perform the functions described below. Additionally or alternatively, the wireless device may perform aspects the functions described below using special-purpose hardware.

At block 1105, the method may include identifying a time domain bundling parameter of a user equipment (UE) that indicates redundant versions of a transmission are to be transmitted from the UE, as described above with reference to FIGS. 1-5. In some examples, the operations of block 1105 may be performed by the bundling parameter module 705 as described above with reference to FIG. 7-8.

At block 1110, the method may include determining that data is to be transmitted from the UE according to the time domain bundling parameter as described above with reference to FIGS. 1-5. In some examples, the operations of block 1110 may be performed by the coverage enhancement module 610 as described above with reference to FIG. 6-8.

At block 1115, the method may include identifying a sequence of deterministic variations for use in transmitting the data, as described above with reference to FIGS. 1-5. In some examples, the operations of block 1115 may be performed by the coverage enhancement module 610 as described above with reference to FIG. 6-8.

At block 1120, the method may include applying the sequence of deterministic variations to consecutive transmissions of the data as described above with reference to FIGS. 1-5. In some examples, the operations of block 1120 may be performed by the coverage enhancement module 610 as described above with reference to FIG. 6-8.

Figure 12:
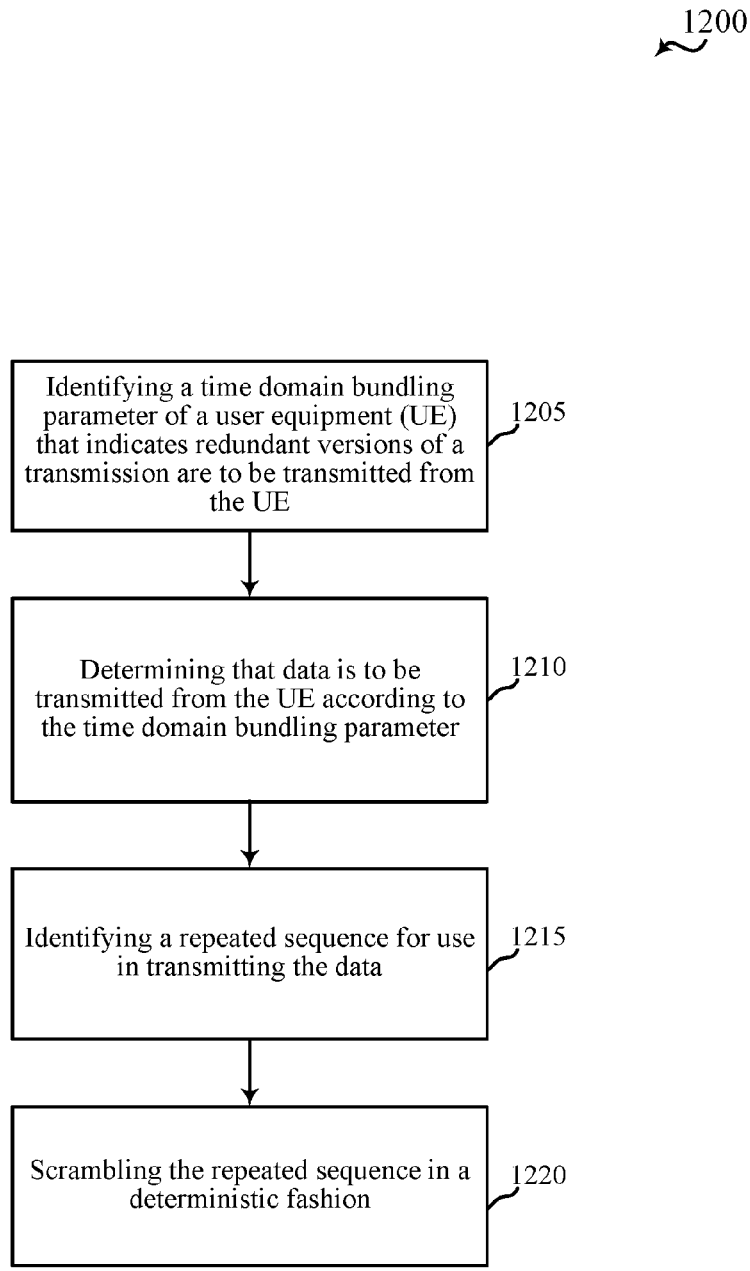
FIG. 12 shows a flowchart illustrating a method for communication with coverage enhancement in accordance with various aspects of the present disclosure.

FIG. 12 shows a flowchart illustrating a method 1200 for coverage enhancement in accordance with various aspects of the present disclosure. The operations of method 1200 may be implemented by a wireless device (e.g., a base station 105, a wireless device 600 or a wireless device 700) or its components as described with reference to FIGS. 1-10. For example, the operations of method 1200 may be performed by the coverage enhancement module 610 as described with reference to FIGS. 6-8. In some examples, a wireless device may execute a set of codes to control the functional elements of the wireless device to perform the functions described below. Additionally or alternatively, the wireless device may perform aspects the functions described below using special-purpose hardware. The method 1200 may also incorporate aspects of method 1100 of FIG. 11.

At block 1205, the method may include identifying a time domain bundling parameter of a user equipment (UE) that indicates redundant versions of a transmission are to be transmitted from the UE, as described above with reference to FIGS. 1-5. In some examples, the operations of block 1205 may be performed by the bundling parameter module 705 as described above with reference to FIG. 7-8.

At block 1210, the method may determining that data is to be transmitted from the UE according to the time domain bundling parameter as described above with reference to FIGS. 1-5. In some examples, the operations of block 1210 may be performed by the coverage enhancement module 610 as described above with reference to FIG. 6-8.

At block 1215, the method may include identifying a repeated sequence for use in transmitting the data as described above with reference to FIGS. 1-5. In some examples, the operations of block 1215 may be performed by the sequence control module 710 as described above with reference to FIG. 7-8.

At block 1220, the method may include scrambling the repeated sequence in a deterministic fashion as described above with reference to FIGS. 1-5. In some examples, the operations of block 1220 may be performed by the scrambling module 805 as described above with reference to FIG. 8.

Figure 13:
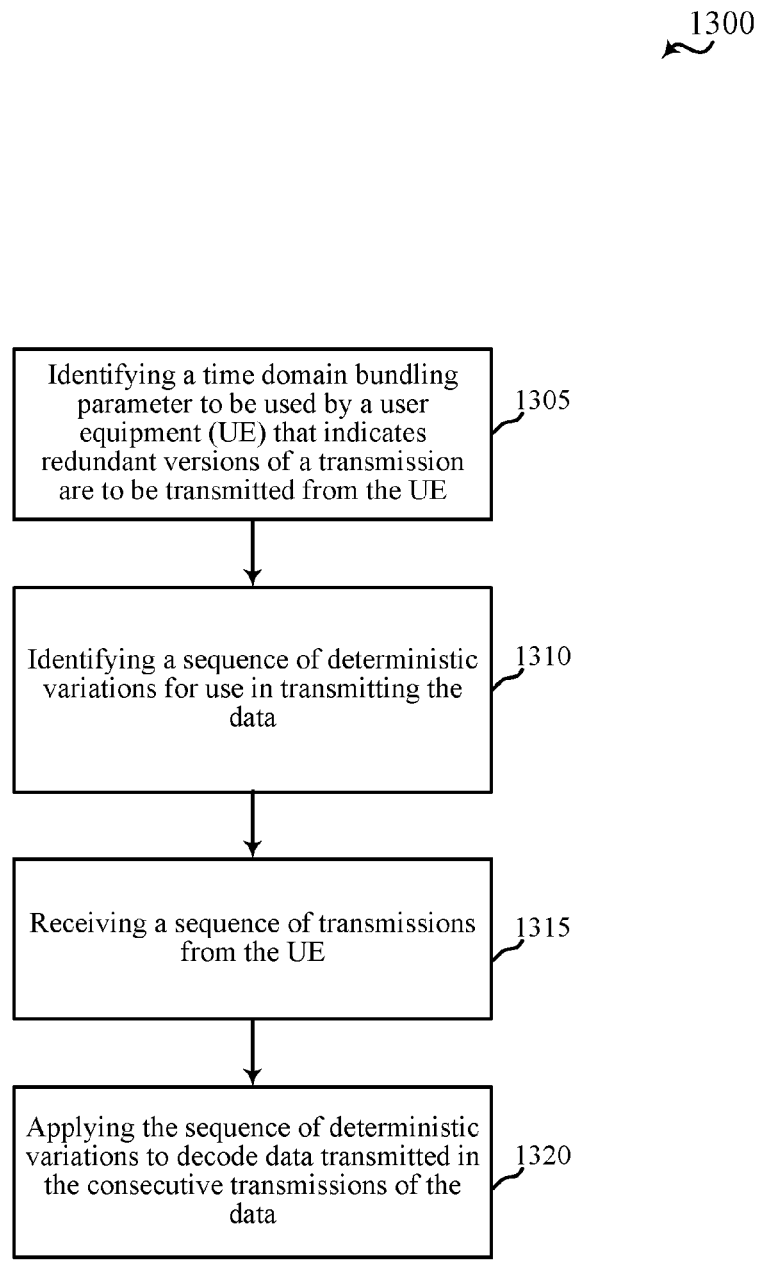
FIG. 13 shows a flowchart illustrating a method for communication with coverage enhancement in accordance with various aspects of the present disclosure.

FIG. 13 shows a flowchart illustrating a method 1300 for coverage enhancement in accordance with various aspects of the present disclosure. The operations of method 1300 may be implemented by a wireless device (e.g., a base station 105, a wireless device 600 or a wireless device 700) or its components as described with reference to FIGS. 1-10. For example, the operations of method 1300 may be performed by the coverage enhancement module 610 as described with reference to FIGS. 6-8. In some examples, a wireless device may execute a set of codes to control the functional elements of the wireless device to perform the functions described below. Additionally or alternatively, the wireless device may perform aspects the functions described below using special-purpose hardware.

At block 1305, the method may include identifying a time domain bundling parameter to be used by a user equipment (UE) that indicates redundant versions of a transmission are to be transmitted from the UE, as described above with reference to FIGS. 1-5. In some examples, the operations of block 1305 may be performed by the bundling parameter module 705 as described above with reference to FIG. 7-8.

At block 1310, the method may include identifying a sequence of deterministic variations for use in transmitting the data as described above with reference to FIGS. 1-5. In some examples, the operations of block 1310 may be performed by the coverage enhancement module 610 as described above with reference to FIG. 6-8.

At block 1315, the method may include receiving a sequence of transmissions from the UE as described above with reference to FIGS. 1-5. In some examples, the operations of block 1315 may be performed by the receiver 605 as described above with reference to FIG. 6.

At block 1320, the method may include applying the sequence of deterministic variations to decode data transmitted in the consecutive transmissions of the data as described above with reference to FIGS. 1-5. In some examples, the operations of block 1320 may be performed by the coverage enhancement module 610 as described above with reference to FIG. 6-8.

Figure 14:
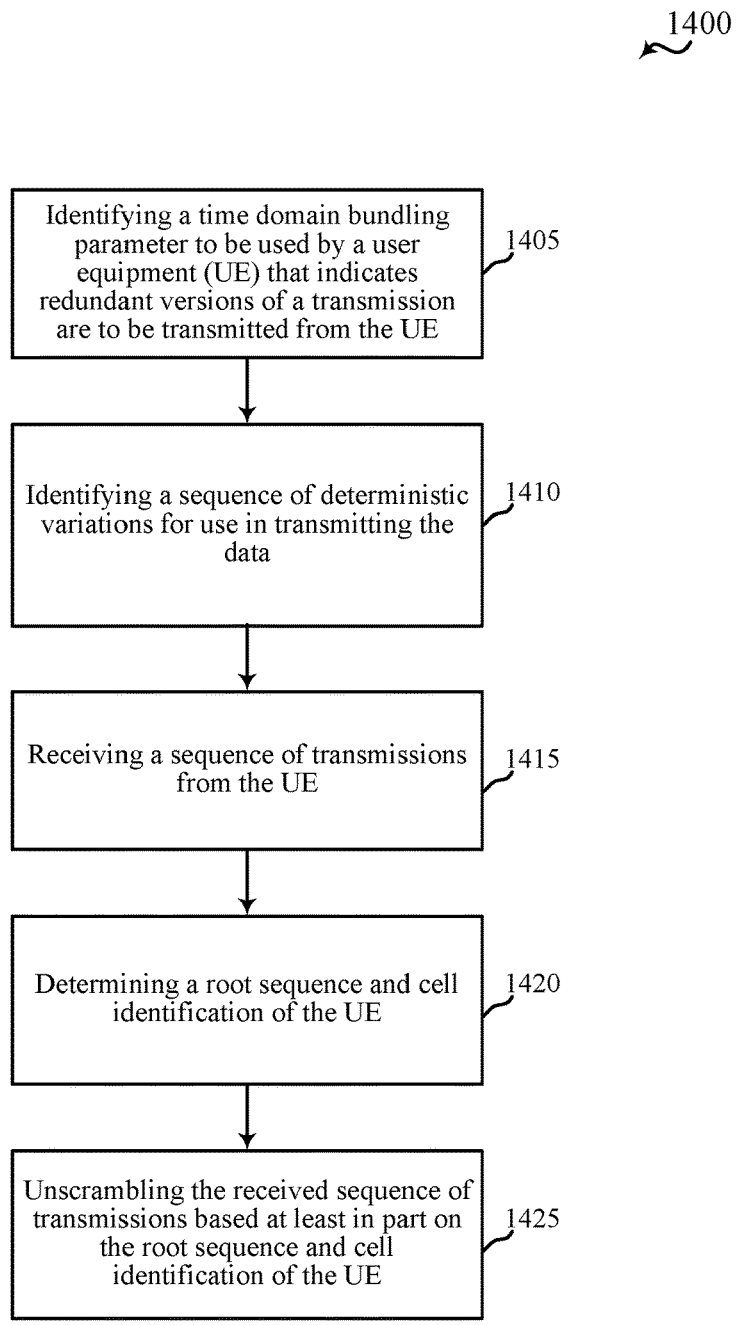
FIG. 14 shows a flowchart illustrating a method for communication with coverage enhancement in accordance with various aspects of the present disclosure.

FIG. 14 shows a flowchart illustrating a method 1400 for coverage enhancement in accordance with various aspects of the present disclosure. The operations of method 1400 may be implemented by a wireless device (e.g., a base station 105, a wireless device 600 or a wireless device 700) or its components as described with reference to FIGS. 1-10. For example, the operations of method 1400 may be performed by the coverage enhancement module 610 as described with reference to FIGS. 6-8. In some examples, a wireless device may execute a set of codes to control the functional elements of the wireless device to perform the functions described below. Additionally or alternatively, the wireless device may perform aspects the functions described below using special-purpose hardware. The method 1400 may also incorporate aspects of method 1300 of FIG. 13.

At block 1405, the method may include identifying a time domain bundling parameter to be used by a user equipment (UE) that indicates redundant versions of a transmission are to be transmitted from the UE, as described above with reference to FIGS. 1-5. In some examples, the operations of block 1405 may be performed by the bundling parameter module 705 as described above with reference to FIG. 7-8.

At block 1410, the method may include identifying a sequence of deterministic variations for use in transmitting the data as described above with reference to FIGS. 1-5. In some examples, the operations of block 1410 may be performed by the coverage enhancement module 610 as described above with reference to FIG. 6-8.

At block 1415, the method may include receiving a sequence of transmissions from the UE as described above with reference to FIGS. 1-5. In some examples, the operations of block 1415 may be performed by the receiver 605 as described above with reference to FIG. 6.

At block 1420, the method may include determining a root sequence and cell identification of the UE as described above with reference to FIGS. 1-5. In some examples, the operations of block 1420 may be performed by the coverage enhancement module 610 as described above with reference to FIG. 6-8.

At block 1425, the method may include unscrambling the received sequence of transmissions based at least in part on the root sequence and cell identification of the UE as described above with reference to FIGS. 1-5. In some examples, the operations of block 1425 may be performed by the coverage enhancement module 610 as described above with reference to FIG. 6-8 or the scrambling module 805 of FIG. 8.

Figure 15:
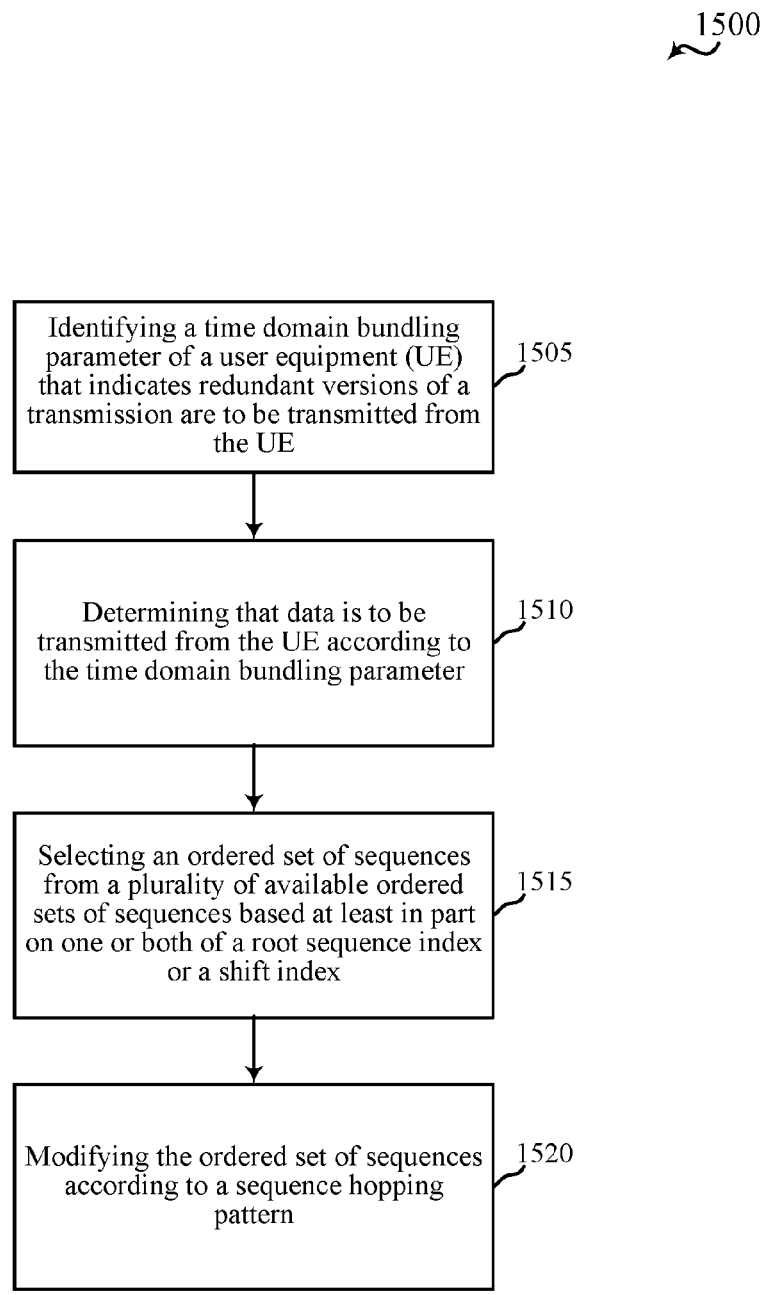
FIG. 15 shows a flowchart illustrating a method for communication with coverage enhancement in accordance with various aspects of the present disclosure.

FIG. 15 shows a flowchart illustrating a method 1500 for coverage enhancement in accordance with various aspects of the present disclosure. The operations of method 1500 may be implemented by a wireless device (e.g., a UE 115, a wireless device 600 or a wireless device 700) or its components as described with reference to FIGS. 1-10. For example, the operations of method 1500 may be performed by the coverage enhancement module 610 as described with reference to FIGS. 6-8. In some examples, a wireless device may execute a set of codes to control the functional elements of the wireless device to perform the functions described below. Additionally or alternatively, the wireless device may perform aspects the functions described below using special-purpose hardware.

At block 1505, the method may include identifying a time domain bundling parameter of a user equipment (UE) that indicates redundant versions of a transmission are to be transmitted from the UE, as described above with reference to FIGS. 1-5. In some examples, the operations of block 1505 may be performed by the bundling parameter module 705 as described above with reference to FIG. 7-8.

At block 1510, the method may include determining that data is to be transmitted from the UE according to the time domain bundling parameter as described above with reference to FIGS. 1-5. In some examples, the operations of block 1510 may be performed by the coverage enhancement module 610 as described above with reference to FIG. 6-8.

At block 1515, the method may include selecting an ordered set of sequences from a plurality of available ordered sets of sequences based at least in part on one or both of a root sequence index or a shift index, as described above with reference to FIGS. 1-5. In some examples, the operations of block 1515 may be performed by the sequence control module 710 as described above with reference to FIG. 7-8.

At block 1520, the method may include modifying the ordered set of sequences according to a sequence hopping pattern as described above with reference to FIGS. 1-5. In some examples, the operations of block 1520 may be performed by the sequence hopping pattern module 815 as described above with reference to FIG. 8.

Figure 16:
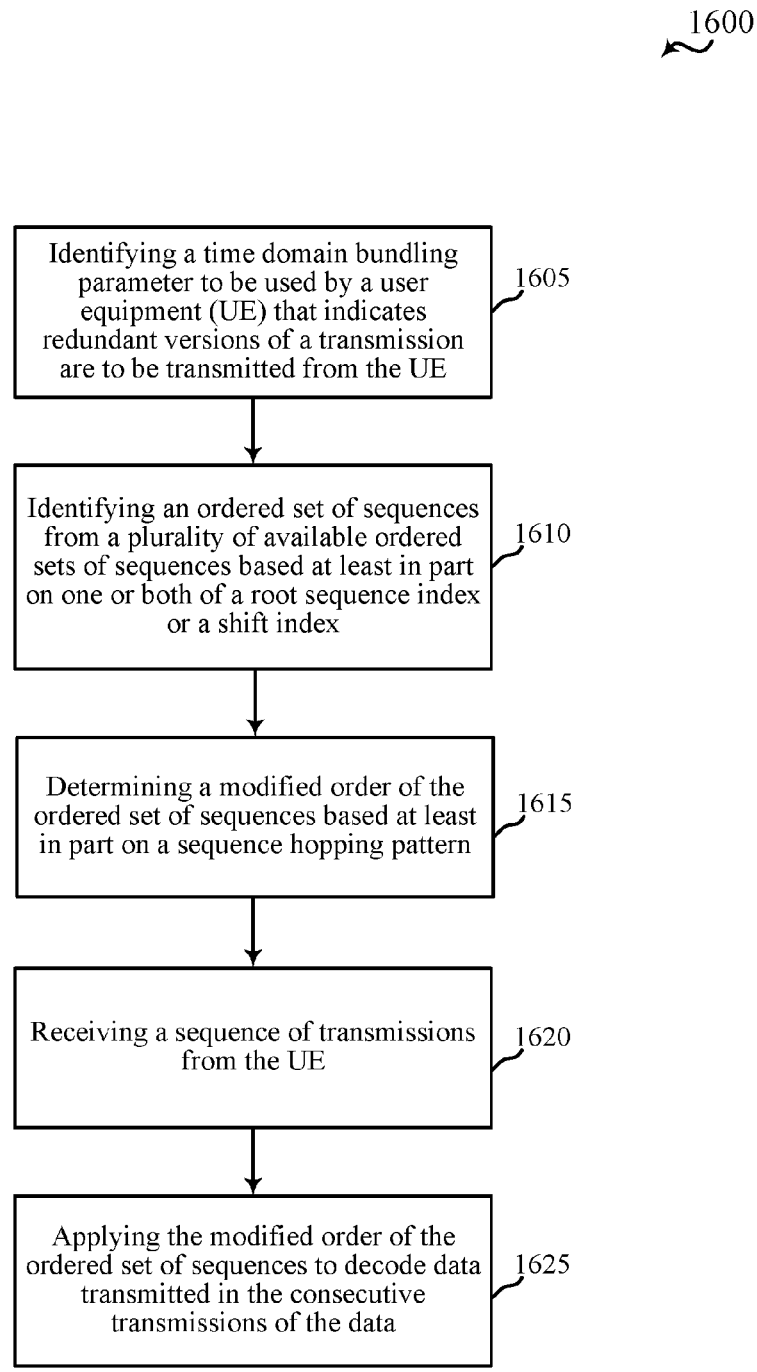
FIG. 16 shows a flowchart illustrating a method for communication with coverage enhancement in accordance with various aspects of the present disclosure.

FIG. 16 shows a flowchart illustrating a method 1600 for coverage enhancement in accordance with various aspects of the present disclosure. The operations of method 1600 may be implemented by a wireless device (e.g., a base station 105, a wireless device 600 or a wireless device 700) or its components as described with reference to FIGS. 1-10. For example, the operations of method 1600 may be performed by the coverage enhancement module 610 as described with reference to FIGS. 6-8. In some examples, a wireless device may execute a set of codes to control the functional elements of the wireless device to perform the functions described below. Additionally or alternatively, the wireless device may perform aspects the functions described below using special-purpose hardware.

At block 1605, the method may include identifying a time domain bundling parameter to be used by a user equipment (UE) that indicates redundant versions of a transmission are to be transmitted from the UE, as described above with reference to FIGS. 1-5. In some examples, the operations of block 1605 may be performed by the bundling parameter module 705 as described above with reference to FIG. 7-8.

At block 1610, the method may include identifying an ordered set of sequences from a plurality of available ordered sets of sequences based at least in part on one or both of a root sequence index or a shift index, as described above with reference to FIGS. 1-5. In some examples, the operations of block 1610 may be performed by the sequence control module 710 as described above with reference to FIG. 7-8.

At block 1615, the method may include determining a modified order of the ordered set of sequences based at least in part on a sequence hopping pattern, as described above with reference to FIGS. 1-5. In some examples, the operations of block 1615 may be performed by the sequence hopping pattern module 815 as described above with reference to FIG. 8.

At block 1620, the method may include receiving a sequence of transmissions from the UE as described above with reference to FIGS. 1-5. In some examples, the operations of block 1620 may be performed by the receiver 605 as described above with reference to FIG. 6.

At block 1625, the method may include applying the modified order of the ordered set of sequences to decode data transmitted in the consecutive transmissions of the data, as described above with reference to FIGS. 1-5. In some examples, the operations of block 1625 may be performed by the sequence control module 710 as described above with reference to FIG. 7-8.

Thus, methods 1100, 1200, 1300, 1400, 1500 and 1600 may provide for coverage enhancement in a wireless system. It should be noted that methods 1100, 1200, 1300, 1400, 1500, and 1600 describe possible implementation, and that the operations and the steps may be rearranged or otherwise modified such that other implementations are possible. In some examples, aspects from two or more of the methods 1100, 1200, 1300, 1400, 1500, and 1600 may be combined.

Figure 17:
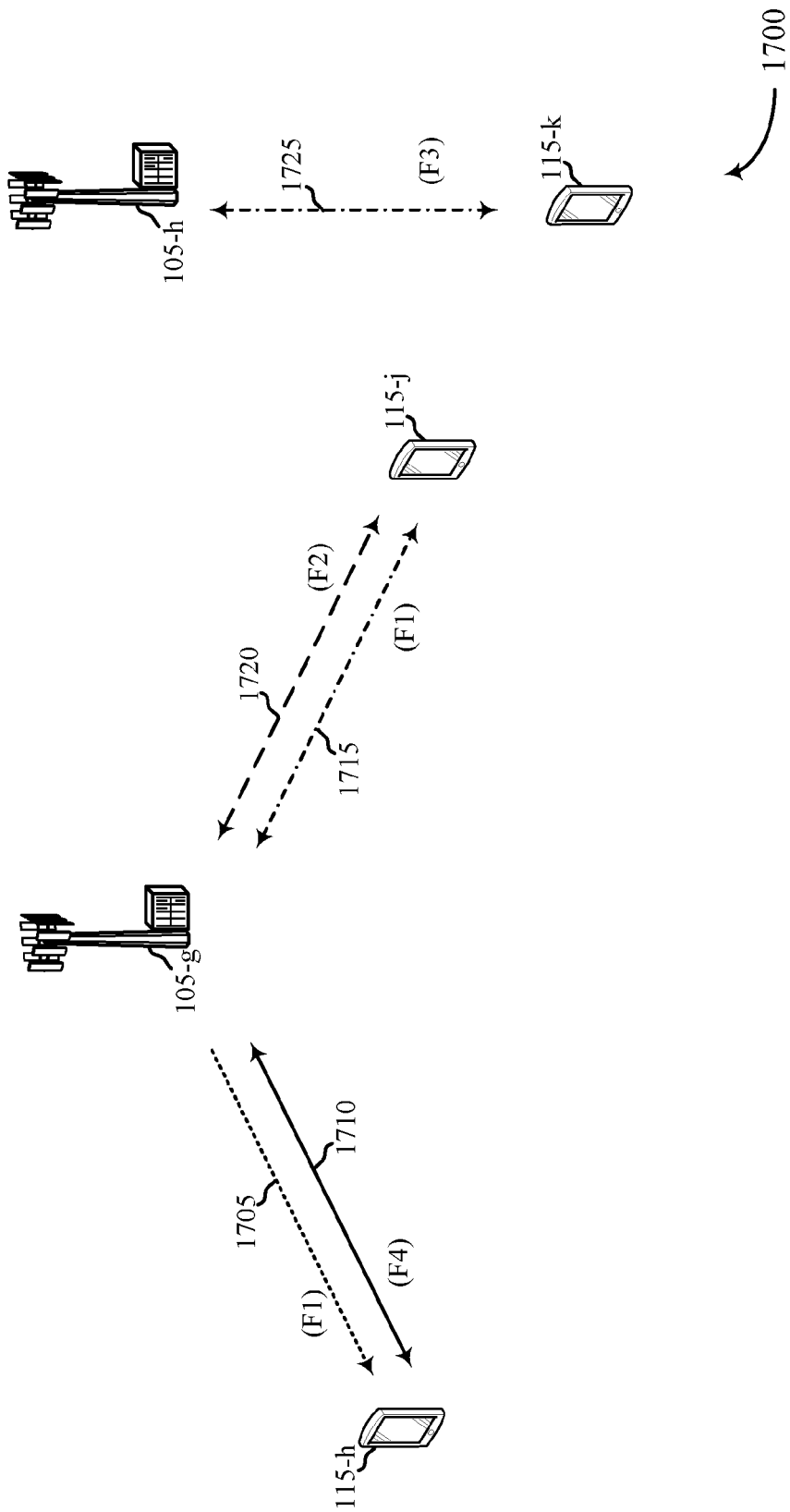
FIG. 17 shows a wireless communication system in which LTE/LTE-A may be deployed under different scenarios using an unlicensed spectrum in accordance with various aspects of the present disclosure.

In some cases, aspects of the techniques described above may be used for communication in an unlicensed spectrum. FIG. 17 shows a wireless communication system 1700 in which LTE/LTE-A may be deployed under different scenarios using an unlicensed spectrum in accordance with various aspects of the present disclosure. More specifically, FIG. 17 illustrates examples of a supplemental downlink mode (also referred to as a first licensed assisted access (LAA) mode), a carrier aggregation mode (also referred to as a second licensed assisted access mode), and a standalone mode, in which LTE/LTE-A is deployed using at least an unlicensed spectrum. The wireless communication system 1700 may be an example of portions of the wireless communication system 100 described with reference to FIG. 1. Moreover, a first base station 105-g and a second base station 105-h may be examples of aspects of one or more of the base stations 105 described with reference to FIG. 1, while a first UE 115-h, a second UE 115-j, and a third UE 115-k may be examples of aspects of one or more of the UEs 115 described with reference to FIG. 1.

In the example of the supplemental downlink mode (e.g., the first licensed assisted access mode) in the wireless communication system 1700, the first base station 105-g may transmit OFDMA waveforms to the first UE 115-h using a downlink channel 1705. The downlink channel 1705 may be associated with a frequency F1 in an unlicensed spectrum. The first base station 105-g may transmit OFDMA waveforms to the first UE 115-h using a first bidirectional link 1710 and may receive SC-FDMA waveforms from the first UE 115-h using the first bidirectional link 1710. The first bidirectional link 1710 may be associated with a frequency F4 in a licensed spectrum. The downlink channel 1705 in the unlicensed spectrum and the first bidirectional link 1710 in the licensed spectrum may operate contemporaneously. The downlink channel 1705 may provide a downlink capacity offload for the first base station 105-g. In some examples, the downlink channel 1705 may be used for unicast services (e.g., addressed to one UE) or for multicast services (e.g., addressed to several UEs). This scenario may occur with any service provider (e.g., a MNO) that uses a licensed spectrum and needs to relieve some of the traffic or signaling congestion.

In the example of the carrier aggregation mode (e.g., the second licensed assisted access mode) in the wireless communication system 1700, the first base station 105-g may transmit OFDMA waveforms to the second UE 115-j using a second bidirectional link 1715 and may receive OFDMA waveforms, SC-FDMA waveforms, or resource block interleaved FDMA waveforms from the second UE 115-j using the second bidirectional link 1715. The second bidirectional link 1715 may be associated with the frequency F1 in an unlicensed spectrum. The first base station 105-g may also transmit OFDMA waveforms to the second UE 115-j using a third bidirectional link 1720 and may receive SC-FDMA waveforms from the second UE 115-j using the third bidirectional link 1720. The third bidirectional link 1720 may be associated with a frequency F2 in a licensed spectrum. The third bidirectional link 1720 may provide a downlink and uplink capacity offload for the first base station 105-g. Like the supplemental downlink mode (e.g., the first licensed assisted access mode) described above, this scenario may occur with any service provider (e.g., MNO) that uses a licensed spectrum and needs to relieve some of the traffic or signaling congestion.

As described above, one type of service provider that may benefit from the capacity offload offered by using LTE/LTE-A in unlicensed spectrum is a traditional MNO having access rights to an LTE/LTE-A licensed spectrum. For these service providers, an operational example may include a bootstrapped mode (e.g., supplemental downlink, carrier aggregation) that uses the LTE/LTE-A primary component carrier (PCC) on the licensed spectrum and at least one secondary component carrier (SCC) on the unlicensed spectrum.

In the carrier aggregation mode, data and control may, for example, be communicated in the licensed spectrum (e.g., via the third bidirectional link 1720) while data may, for example, be communicated in the unlicensed spectrum (e.g., via second bidirectional link 1715). The carrier aggregation mechanisms supported when using an unlicensed spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 1700, the second base station 105-h may transmit OFDMA waveforms to the third UE 115-k using a bidirectional link 1725 and may receive OFDMA waveforms, SC-FDMA waveforms, or resource block interleaved FDMA waveforms from the third UE 115-k using the bidirectional link 1725. The bidirectional link 1725 may be associated with the frequency F3 in an unlicensed spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed spectrum.

In some examples, a transmitting apparatus such as one of the base stations 105, 105-g, or 105-h described with reference to FIG. 1 or 17, or one of the UEs 115, 115-h, 115-j, or 115-k described with reference to FIG. 1 or 17, may use a gating interval to gain access to a wireless channel of an unlicensed spectrum (e.g., to a physical channel of the unlicensed spectrum). In some examples, the gating interval may be synchronous and periodic. For example, the periodic gating interval may be synchronized with at least one boundary of an LTE/LTE-A radio frame interval. In other examples, the gating interval may be asynchronous. The gating interval may define the application of a contention-based protocol, such as a LBT protocol based on the LBT protocol specified in European Telecommunications Standards Institute (ETSI) (EN 301 893). When using a gating interval that defines the application of a LBT protocol, the gating interval may indicate when a transmitting apparatus needs to perform a contention procedure (e.g., a LBT procedure) such as a clear channel assessment (CCA) procedure or an extended CCA (ECCA) procedure. The outcome of the CCA procedure or ECCA procedure may indicate to the transmitting apparatus whether a wireless channel of an unlicensed spectrum is available or in use for the gating interval (e.g., a LBT radio frame or transmission burst). When a CCA procedure or ECCA procedure indicates the wireless channel is available for a corresponding LBT radio frame or transmission burst (e.g., "clear" for use), the transmitting apparatus may reserve or use the wireless channel of the unlicensed spectrum during part or all of the LBT radio frame. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or ECCA procedure for some but not other wireless channels in an unlicensed spectrum.

In some examples, a UE 115 may transmit to a base station, in an unlicensed spectrum, on one or more interlaces of non-contiguous frequency resources. Transmission on an interlace may be used, in some cases, to fulfill a bandwidth occupancy requirement (e.g., an 80% bandwidth occupancy requirement for each transmission). In some examples, an interlace of non-contiguous frequency resources may include a plurality of resource blocks. Each of the resource blocks may include a plurality of contiguous resource elements spanning time (e.g., a plurality of symbol periods within a subframe) and frequency (e.g., a plurality of frequency tones). In some examples, each of the resource blocks of an interlace may be non-contiguous with all other resource blocks of the interlace. For example, in a system bandwidth spanning 100 resource blocks, ten interlaces of non-contiguous frequency resources may be provided, with each of the interlaces including a different set of every tenth resource block in the system bandwidth. In other examples, an interlace of non-contiguous frequency resources may include two or more sets of contiguous resource blocks, with the sets of contiguous resource blocks being non-contiguous. Different interlaces of non-contiguous frequency resources may be allocated to different UEs (e.g., to increase capacity) or to the same UE (e.g., to increase the bandwidth available to the UE).

In some examples, a UE 115 may perform a random access procedure with a base station 105 over an unlicensed spectrum. In these examples, the UE 115 may perform the random access procedure using techniques such as those described with reference to FIGS. 1-5 and 18-22. In some examples, a UE's performance of a random access procedure may include transmitting a sequence of deterministic variations of random access data on at least one interlace of non-contiguous frequency resources allocated to a PRACH in the unlicensed spectrum. The transmitting may begin at a first time. In some examples, the at least one interlace of non-contiguous frequency resources may include one interlace or two interlaces. In some examples the sequence of deterministic variations of random access data may be based at least in part on a Zadoff-Chu sequence. In some examples, the random access data may include a random access preamble (e.g., a preamble including data that identifies the UE, such as a static or semi-static identifier of the UE, or random data).

In some examples, the sequence of deterministic variations may include a sequence of length 113 (e.g., when the at least one interlace of non-contiguous frequency resources allocated to the PRACH includes one interlace, and when the one interlace includes ten resource blocks, with each resource block including twelve frequency tones) or a sequence of length 239 (e.g., when the at least one interlace of non-contiguous frequency resources allocated to the PRACH includes two interlaces, and when each interlace includes ten resource blocks, with each resource block including twelve frequency tones).

In some examples, the sequence of deterministic variations of random access data, to be transmitted during performance of the random access procedure, may be selected based at least in part on a root sequence index or a shift index, as described with reference to FIG. 4B, for example. The use of different root sequence indices, shift indices (i.e., cyclic shifts), or combinations thereof, with minimal cross-correlation, can increase the number of users (e.g., UEs) that may be multiplexed on a given set of resources (e.g., a given set of interlaces of non-contiguous frequency resources).

In some examples, a sequence of deterministic variations of random access data may be transmitted repetitively or in modified forms on the interlace(s) of non-contiguous frequency resources allocated to the PRACH. In some examples, the sequence of deterministic variations of random access data may be transmitted repetitively or in modified form within a subframe, as described, for example, with reference to FIGS. 18-22.

Figure 18:
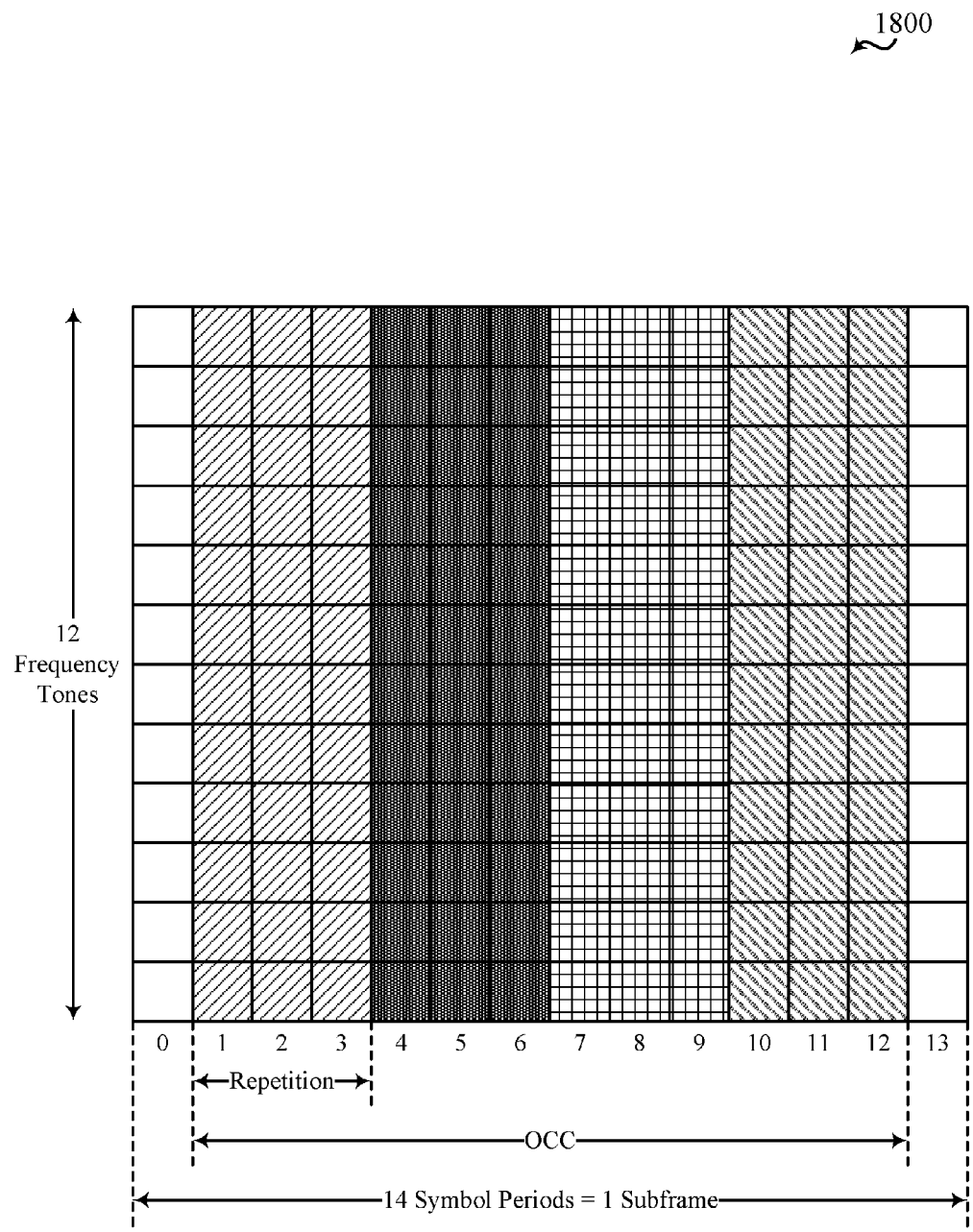
FIG. 18 shows a plurality of resource elements of a resource block in accordance with various aspects of the present disclosure.

FIG. 18 shows a plurality of resource elements of a resource block 1800 in accordance with various aspects of the present disclosure. By way of example, the resource block 1800 spans 14 contiguous symbol periods (e.g., one subframe) and 12 contiguous frequency tones. The resource block may represent the structure of each of a plurality of resource blocks within an interlace of non-contiguous frequency resources.

When the resource block 1800 is included in at least one interlace of non-contiguous frequency resources allocated to a PRACH in an unlicensed spectrum, a UE that performs a random access procedure using the at least one interlace of non-contiguous frequency resources may transmit a sequence of deterministic variations of random access data (e.g., a sequence s(0)) on the at least one interlace, during a second symbol period of a subframe (e.g., during symbol period 1), and may transmit a portion of the sequence of deterministic variations of random access data using the resource elements of the second symbol period of resource block 1800. The UE may repeat the transmission of the sequence of deterministic variations of random access data, on the at least one interlace, beginning at a second time (e.g., during symbol period 2). In some examples, the sequence of deterministic variations of random access data may be transmitted a total of three times (e.g., during each of symbol periods 1, 2, and 3 of the subframe). The repeated transmissions may cause the portion of the sequence of deterministic variations of random access data to be transmitted using the resource elements of symbol periods 2 and 3 of the resource block 1800.

In some examples, the UE may generate at least one modification of the sequence of deterministic variations of random access data. The at least one modification of the sequence of deterministic variations of random access data may be generated according to a modification sequence. In some examples, the modification sequence used to generate the at least one modification of the sequence of deterministic variations of random access data may be based at least in part on an orthogonal cover code (OCC) (e.g., {s(0), s(1), s(2), s(3)}, {s(0), s(1), −s(2), −s(3)}, {s(0), −s(1), s(2), −s(3)}, or {s(0), −s(1), −s(2), s(3)}). In some examples, the UE may generate three modification of the sequence of deterministic variations of random access data. An OCC of level four may enable multiplexing of four PRACH users (e.g., 4 UEs).

The UE may transmit the at least one modification of the sequence of deterministic variations of random access data, on the at least one interlace, beginning at a third time (e.g., during symbol period 4). In some examples, the UE may repeatedly transmit a first modification of the sequence of deterministic variations of random access data (e.g., a sequence s(1)) during each of symbol periods 4, 5, and 6, repeatedly transmit a second modification of the sequence of deterministic variations of random access data (e.g., a sequence s(2)) during each of symbol periods 7, 8, and 9; and repeatedly transmit a third modification of the sequence of deterministic variations of random access data (e.g., a sequence s(3)) during each of symbol periods 10, 11, and 12. In some examples, a symbol transmitted in one of the symbol periods of the subframe may function as a cyclic prefix for a symbol transmitted during a next symbol period.

In some examples, the UE may refrain from transmitting the sequence of deterministic variations of random access data or the modified sequence of deterministic variations of random access data during a temporally first symbol period of the subframe, which may be reserved for performing a LBT procedure or other purposes. The UE may also refrain from transmitting the sequence of deterministic variations of random access data or the modified sequence of deterministic variations of random access data during a temporally last symbol period of the subframe (e.g., the UE may "blank" the temporally last symbol period). Refraining from transmitting the sequence of deterministic variations of random access data or the modified sequence of deterministic variations of random access data during the temporally last symbol period may reduce interference with transmissions in adjacent subframes.

Figure 19:
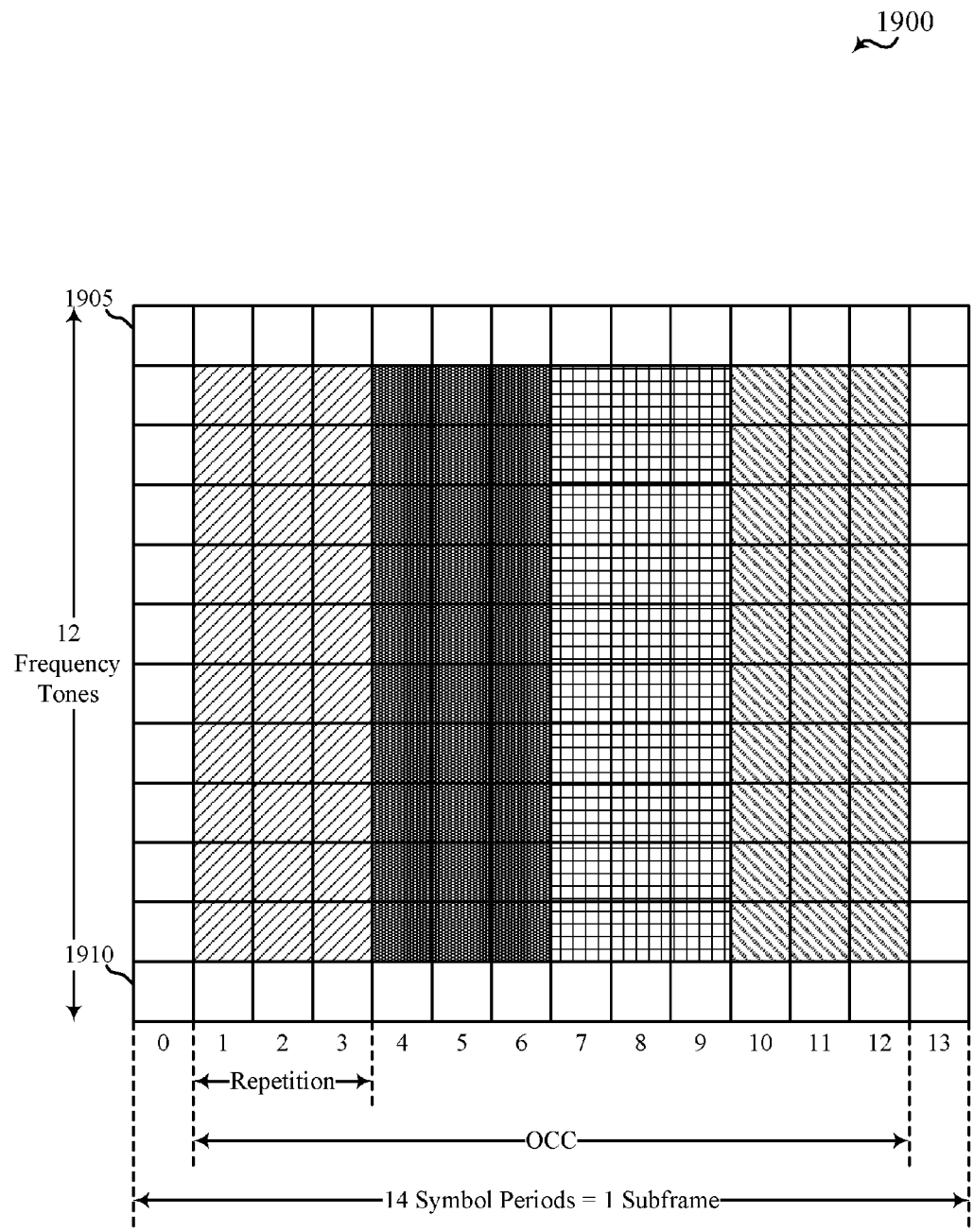
FIG. 19 shows a plurality of resource elements of a resource block in accordance with various aspects of the present disclosure.

FIG. 19 shows a plurality of resource elements of a resource block 1900 in accordance with various aspects of the present disclosure. By way of example, the resource block 1900 spans 14 contiguous symbol periods (e.g., one subframe) and 12 contiguous frequency tones. The resource block may represent the structure of each of a plurality of resource blocks within an interlace of non-contiguous frequency resources.

In some examples, the resource block 1900 may be used by a UE that performs a random access procedure. The resource block 1900 may be used similarly to how the resource block 1800 described with reference to FIG. 18 may be used. However, a UE that uses the resource block 1900 when performing a random access procedure may refrain from transmitting a sequence of deterministic variations of random access data (e.g., a sequence s(0)) or a modified sequence of deterministic variations of random access data (e.g., a sequence s(1), s(2), or s(3)) on one or more of the edge tones (e.g., the UE may blank a highest frequency tone 1905 or lowest frequency tone 1910 of the resource block 1900). Refraining from transmitting the sequence of deterministic variations of random access data or the modified sequence of deterministic variations of random access data on one or more edge tones may reduce interference with transmissions in adjacent resource blocks (e.g., reduce inter-carrier interference).

Figure 20:
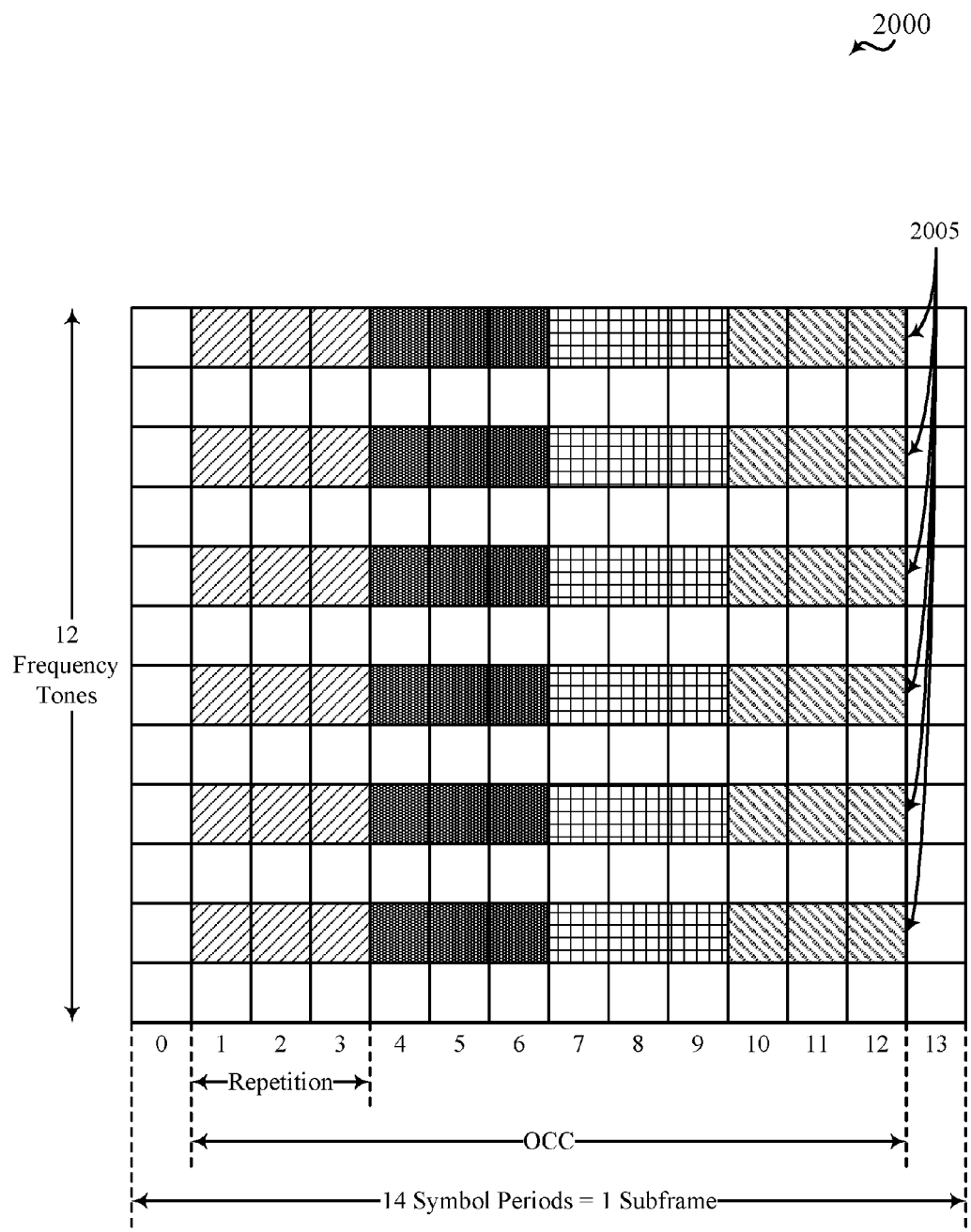
FIG. 20 shows a plurality of resource elements of a resource block in accordance with various aspects of the present disclosure.

FIG. 20 shows a plurality of resource elements of a resource block 2000 in accordance with various aspects of the present disclosure. By way of example, the resource block 2000 spans 14 contiguous symbol periods (e.g., one subframe) and 12 contiguous frequency tones. The resource block may represent the structure of each of a plurality of resource blocks within an interlace of non-contiguous frequency resources.

In some examples, the resource block 2000 may be used by a UE that performs a random access procedure. The resource block 2000 may be used similarly to how the resource block 1800 described with reference to FIG. 18 may be used. However, a UE that uses the resource block 2000 when performing a random access procedure may identify at least one comb of non-contiguous frequency resources within at least one interlace of non-contiguous frequency resources (e.g., a comb 2005 including every nth frequency tone (e.g., every other frequency tone) of the resource block 2000, and may transmit a sequence of deterministic variations of random access data (e.g., a sequence s(0)) or a modified sequence of deterministic variations of random access data (e.g., a sequence s(1), s(2), or s(3)) on the identified comb (e.g., on comb 2005). Different UEs may select the same or different combs for performing a random access procedure. In some examples, the first half of a symbol transmitted in one of the symbol periods of the subframe may function as a cyclic prefix for the second half of the symbol.

Figure 21:
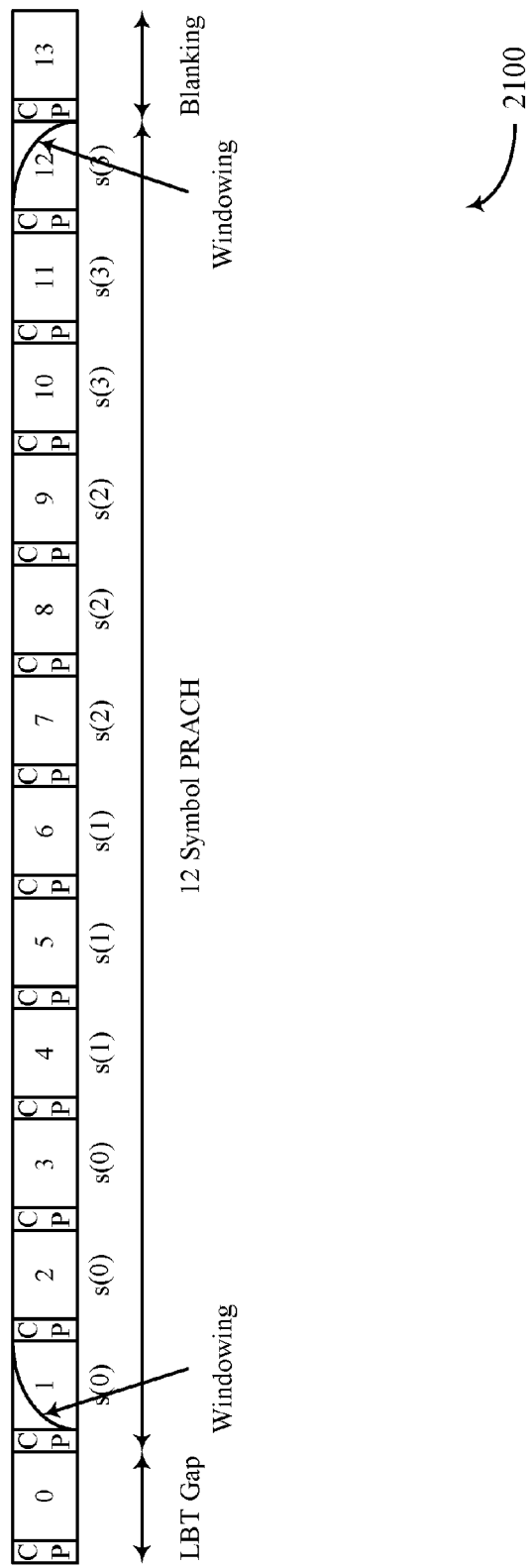
FIG. 21 shows a plurality of symbol periods of a subframe in accordance with various aspects of the present disclosure.

FIG. 21 shows a plurality of symbol periods of a subframe 2100 in accordance with various aspects of the present disclosure. By way of example, the subframe 2100 spans 14 contiguous symbol periods. Also by way of example, each symbol period may include a plurality of tones (e.g., 100 tones), and a plurality of interlaces of non-contiguous frequency resources (e.g., 10 interlaces) may be provided during each symbol period.

In some examples, at least one interlace of non-contiguous frequency tones may be used by a UE that performs a random access procedure during the subframe 2100, and a sequence of deterministic variations of random access data (e.g., a sequence s(0)) or a modified sequence of deterministic variations of random access data (e.g., a sequence s(1), s(2), or s(3)) may be transmitted on the at least one interlace during each of the symbol periods 1-12. In some examples, a transmission within a resource block of the at least one interlace may be formatted, at least in part, using techniques described with reference to one or more of FIGS. 18-20. In some examples, a transmission during a symbol period may be begin with a CP. At least one transmission of a sequence of deterministic variations of random access data or a modified sequence of deterministic variations of random access data may be windowed. "Windowing" a transmission may include masking or blanking part or all of one or more frequency tones. In some examples, windowing may be applied to at least one of: a temporally first transmission of the sequence of deterministic variations of random access data (e.g., in symbol period 1), or a temporally last transmission of a modified sequence of deterministic variations of random access data (e.g., in symbol period 12). In other examples, windowing may be applied to at least one of: a temporally first transmission of a modified sequence of deterministic variations of random access data, or a temporally last transmission of the sequence of deterministic variations of random access data. Windowing may reduce interference with transmissions in adjacent resource blocks (e.g., reduce inter-carrier interference) and better enable a receiving apparatus (e.g., a base station) to find and decode a random access transmission by a UE.

Figure 22:
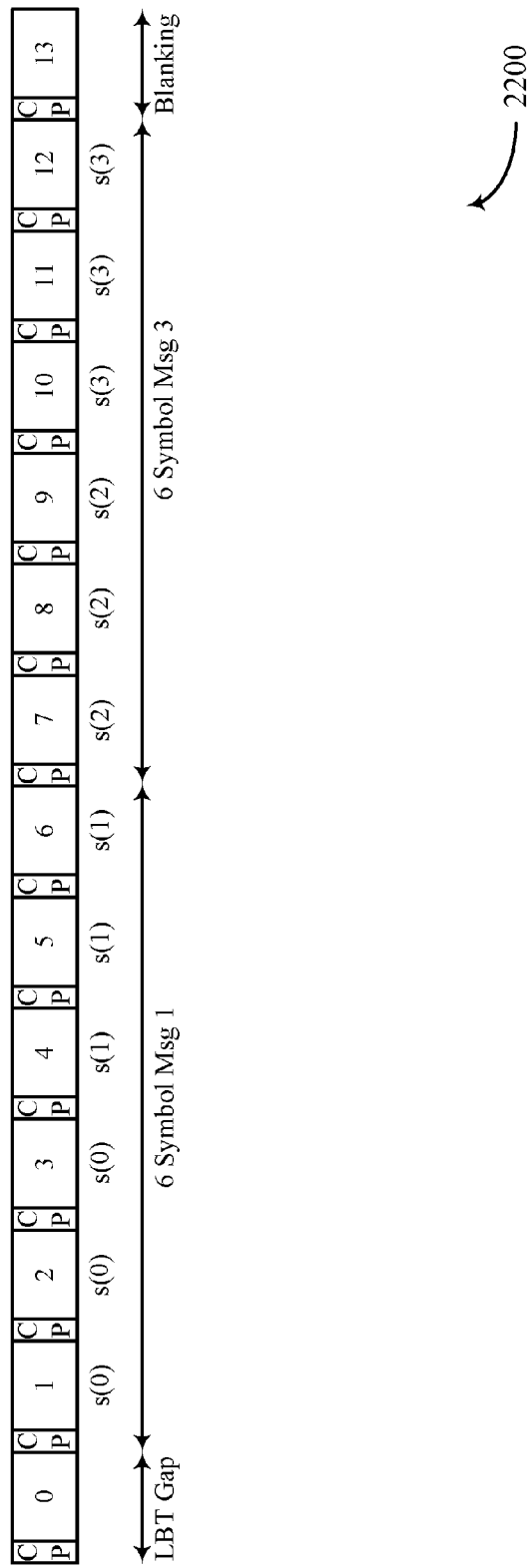
FIG. 22 shows a plurality of symbol periods of a subframe in accordance with various aspects of the present disclosure.

FIG. 22 shows a plurality of symbol periods of a subframe 2200 in accordance with various aspects of the present disclosure. By way of example, the subframe 2200 spans 14 contiguous symbol periods. Also by way of example, each symbol period may include a plurality of tones (e.g., 100 tones), and a plurality of interlaces of non-contiguous frequency resources (e.g., 10 interlaces) may be provided during each symbol period.

In some examples, at least one interlace of non-contiguous frequency tones may be used by a UE that performs a random access procedure during the subframe 2200, and a sequence of deterministic variations of random access data or a modified sequence of deterministic variations of random access data may be transmitted on the at least one interlace during each of the symbol periods 1-12. In some examples, a sequence of deterministic variations of random access data (e.g., a sequence s(0) including a random access preamble) may be transmitted, repeatedly, in each of symbol periods 1, 2, and 3, and a modified sequence of deterministic variations of random access data (e.g., a sequence s(1)) may be transmitted, repeatedly, in each of symbol periods 4, 5, and 6. In each of symbol periods 7-12, an RRC connection request, or repetition or modification thereof, may be transmitted. For example, an RRC connection request (e.g., s(2)) may be transmitted, repeatedly, in each of symbol periods 7, 8, and 9, and a modified version of the RRC connection request (e.g., s(3)) may be transmitted, repeatedly, in each of symbol periods 10, 11, and 12. In some examples, an OCC may be used to generate the modified version of the RRC connection request.

In some examples, the transmissions of the sequence of deterministic variations of random access data and the modified sequence of deterministic variations of random access data may correspond to a PRACH message 1 (Msg 1), and the transmissions of the RRC connection request and modified version of the RRC connection request may correspond to a PRACH Msg 3. In some examples, a transmission during a symbol period may be begin with a CP.

Figure 23:
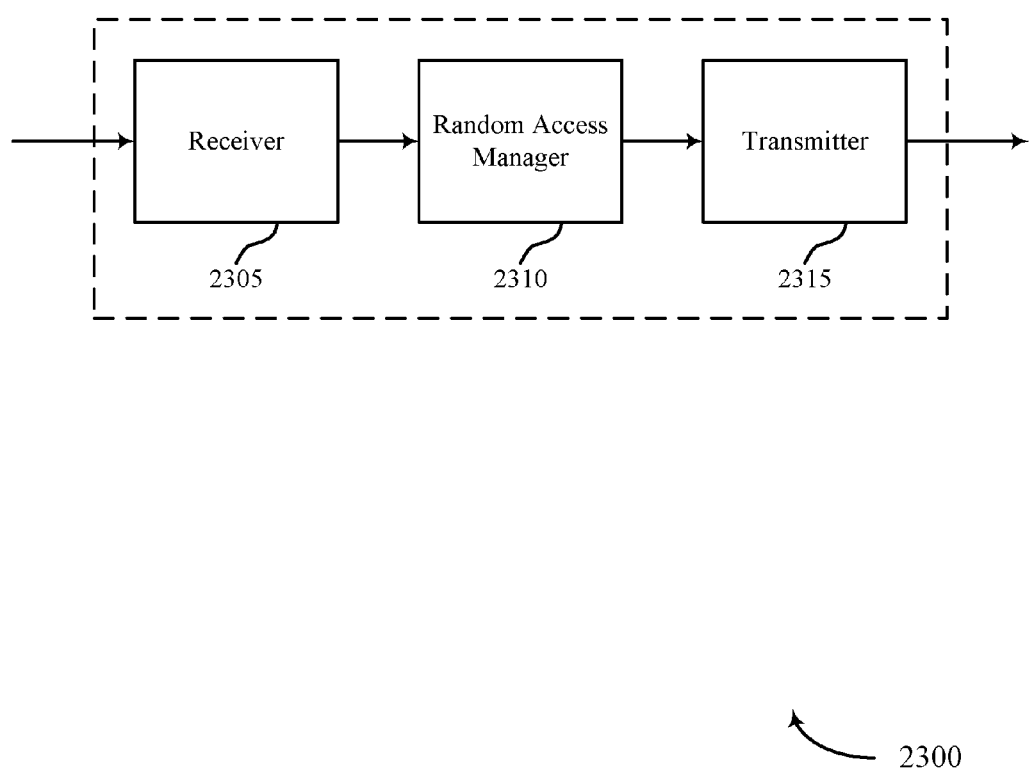
FIG. 23 shows a block diagram of a wireless device configured for performing a random access procedure in an unlicensed spectrum in accordance with various aspects of the present disclosure.

FIG. 23 shows a block diagram of a wireless device 2300 configured for performing a random access procedure in an unlicensed spectrum in accordance with various aspects of the present disclosure. Wireless device 2300 may be an example of aspects of a UE 115 described with reference to FIGS. 1, 2, 9, and 17. Wireless device 2300 may include a receiver 2305, a random access manager 2310, or a transmitter 2315. Wireless device 2300 may also include a processor. Each of these components may be in communication with each other.

The components of wireless device 2300 may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 2305 may receive information such as packets, user data, or control information associated with various information channels (e.g., control channels, data channels, etc.). Received information, if any, may be passed on to the random access manager 2310 or other components of wireless device 2300. In some examples, the receiver 2305 may receive configuration information for performing a random access procedure (e.g., an indication of at least one interlace or comb of frequency resources allocated to a PRACH in an unlicensed spectrum). In some examples, part or all of the configuration information for performing a random access procedure may be pre-configured on the wireless device 2300.

The random access manager 2310 may manage the performance of a random access procedure by the wireless device 2300, as described with reference to FIGS. 17-22.

The transmitter 2315 may transmit signals received from other components of wireless device 2300, including a sequence of deterministic variations of random access data received from the random access manager 2310 and at least one modification of the sequence of deterministic variations of random access data received from the random access manager 2310. In some examples, the transmitter 2315 may be collocated with the receiver 2305 in a transceiver module. The transmitter 2315 may include a single antenna, or it may include a plurality of antennas.

Figure 24:
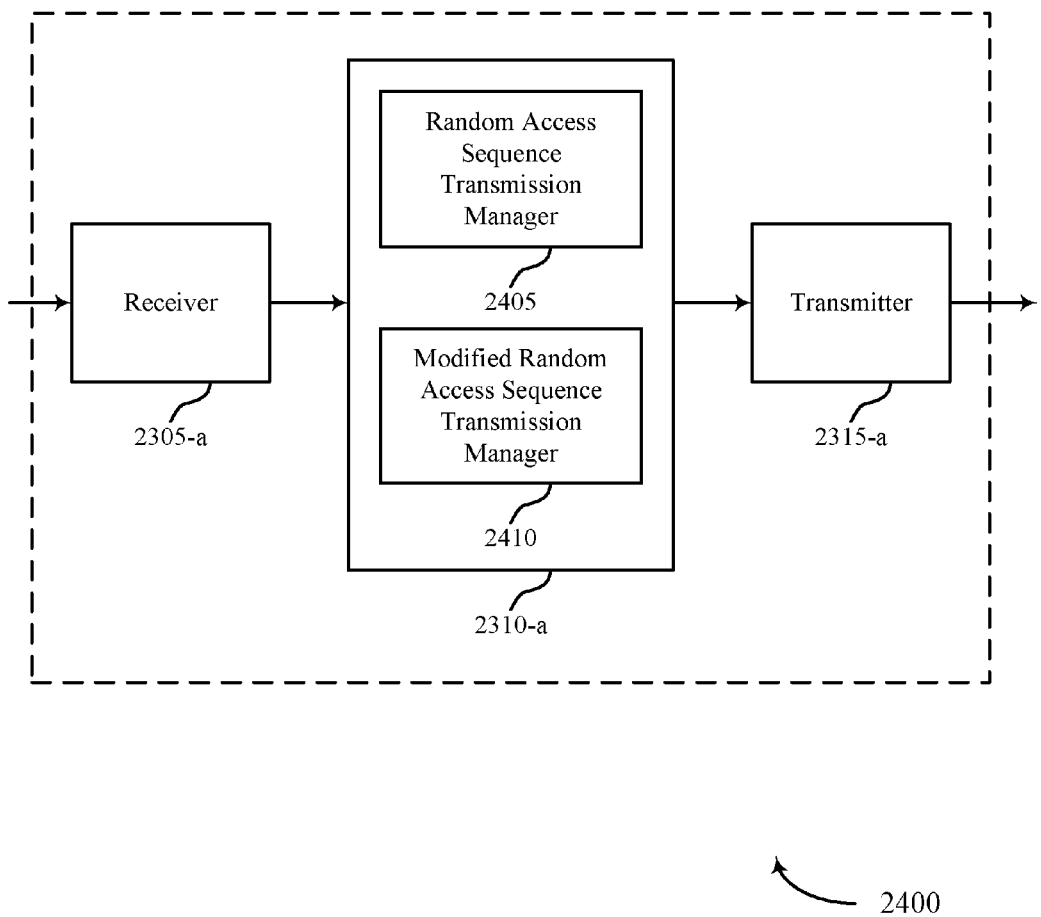
FIG. 24 shows a block diagram of a wireless device configured for performing a random access procedure in an unlicensed spectrum in accordance with various aspects of the present disclosure.

FIG. 24 shows a block diagram of a wireless device 2400 configured for performing a random access procedure in an unlicensed spectrum in accordance with various aspects of the present disclosure. Wireless device 2400 may be an example of aspects of a UE 115 described with reference to FIGS. 1, 2, 9, and 17, and an example of aspects of the wireless device 2300 described with reference to FIG. 23. Wireless device 2400 may include a receiver 2305-a, a random access manager 2310-a, or a transmitter 2315-a. Wireless device 2400 may also include a processor. Each of these components may be in communication with each other. The random access manager 2310-a may include a random access sequence transmission manager 2405 and a modified random access sequence transmission manager 2410.

The components of wireless device 2400 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 2305-a may receive information which may be passed on to the random access manager 2310-a, and to other components of wireless device 2400. The random access manager 2310-a may perform the operations described above with reference to FIG. 23. The transmitter 2315-a may transmit signals received from other components of wireless device 2400.

The random access sequence transmission manager 2405 may transmit a sequence of deterministic variations of random access data on at least one interlace of non-contiguous frequency resources allocated to a PRACH in an unlicensed spectrum, via the transmitter 2315-a, as described above with reference to FIGS. 17-22. The transmitting may begin at a first time. In some examples, the at least one interlace of non-contiguous frequency resources may include one interlace or two interlaces. In some examples the sequence of deterministic variations of random access data may be based at least in part on a Zadoff-Chu sequence. In some examples, the random access data may include a random access preamble (e.g., a preamble including data that identifies the wireless device 2400, such as a static or semi-static identifier of the wireless device 2400, or random data). The random access sequence transmission manager 2405 may repeat the transmitting of the sequence of deterministic variations of random access data at least once, beginning at a second time, as described above with reference to FIGS. 17-22. In some examples, the transmitting of the sequence of deterministic variations of random access data may be repeated two times, at two different times.

The modified random access sequence transmission manager 2410 may generate at least one modification of the sequence of deterministic variations of random access data, as described above with reference to FIGS. 17-22. The at least one modification of the sequence of deterministic variations of random access data may be generated according to a modification sequence. The modified random access sequence transmission manager 2410 may also transmit on the at least one interlace, beginning at a third time, the at least one modification of the sequence of deterministic variations of random access data, as described above with reference to FIGS. 17-22.

In some examples, the random access sequence transmission manager 2405 may select the sequence of deterministic variations of random access data based at least in part on a root sequence index or a shift index, as described above with reference to FIGS. 3B and 17-22. In some examples, the modified random access sequence transmission manager 2410 may select an OCC. In these examples, the modification sequence used to generate the at least one modification of the sequence of deterministic variations of random access data may be based at least in part on the selected OCC. In some examples, the first time, the second time, the third time, and other times, at which the sequence of deterministic variations of random access data are transmitted by the random access sequence transmission manager 2405 or a modification of the sequence of deterministic variations of random access data is transmitted by the modified random access sequence transmission manager 2410, may occur in different TTIs.

In some examples the random access sequence transmission manager 2405 may window at least one of: a temporally first transmission of the sequence of deterministic variations of random access data, or a temporally last transmission of a sequence of deterministic variations of random access data, as described above with reference to FIG. 21. Also or alternatively, the modified random access sequence transmission manager 2410 may window at least one of: a temporally first transmission of a modified sequence of deterministic variations of random access data, or a temporally last transmission of a modified sequence of deterministic variations of random access data, as described above with reference to FIG. 21.

Figure 25:
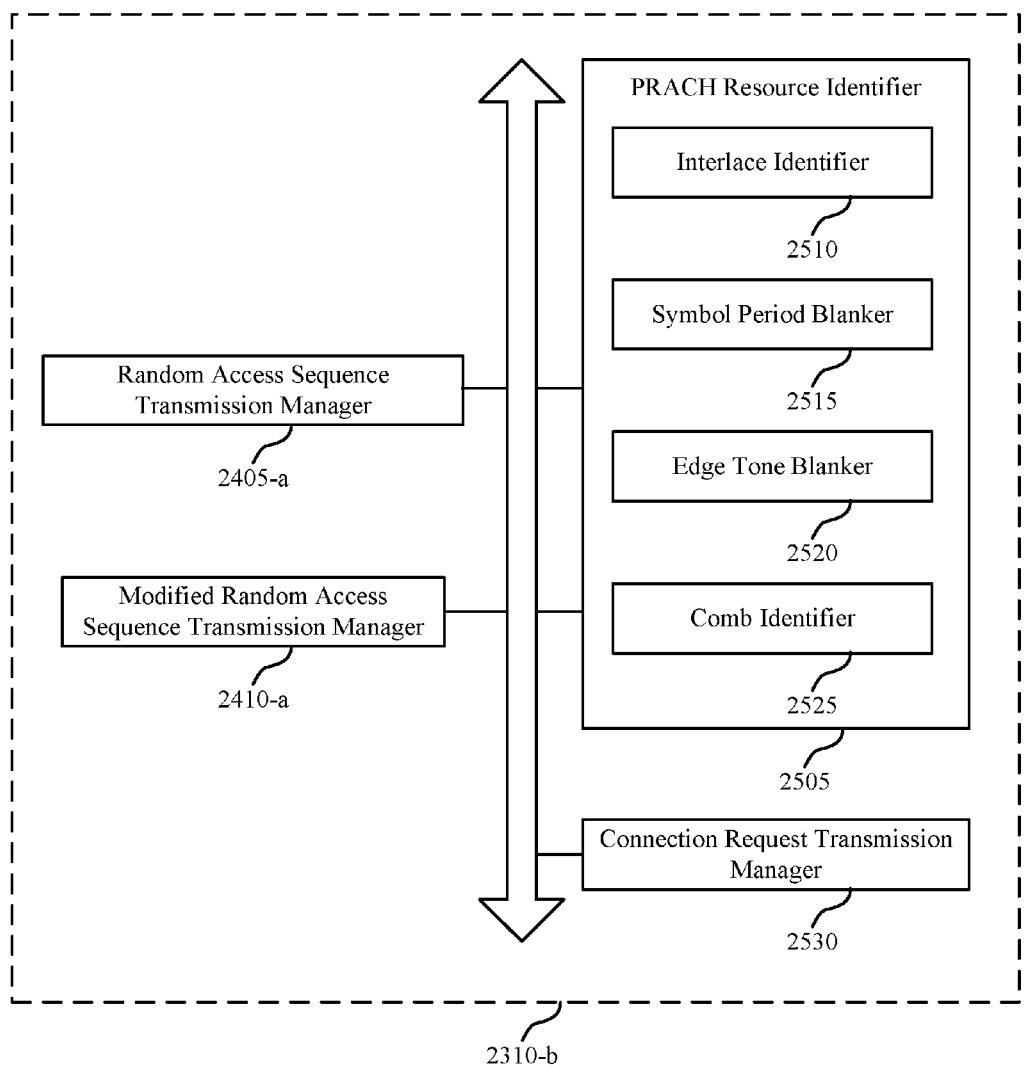
FIG. 25 shows a block diagram of a random access manager for performing a random access procedure in an unlicensed spectrum in accordance with various aspects of the present disclosure.

FIG. 25 shows a block diagram of a random access manager 2310-b for performing a random access procedure in an unlicensed spectrum in accordance with various aspects of the present disclosure. The random access manager 2310-b may be an example of aspects of a random access manager 2310 described with reference to FIGS. 23-24. The random access manager 2310-b may include a random access sequence transmission manager 2405-a and a modified random access sequence transmission manager 2410-a. Each of these components may perform the functions described above with reference to FIG. 24. The random access manager 2310-b may also include a PRACH resource identifier 2505 or a connection request transmission manager 2530. The PRACH resource identifier 2505 may include an interlace identifier 2510, a symbol period blanker 2515, an edge tone blanker 2520, or a comb identifier 2525.

The components of the random access manager 2310-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The PRACH resource identifier 2505 may be configured to identify resources that may or may not be used for transmitting random access data. The interlace identifier 2510 may be configured to identify at least one interlace of non-contiguous frequency resources allocated to a PRACH in an unlicensed spectrum, as described above with reference to FIG. 17. In some examples, the non-contiguous frequency resources may include a plurality of resource blocks. In some examples, each of the resource blocks of an interlace may be non-contiguous with all other resource blocks of the interlace. In other examples, two or more sets of contiguous resource blocks in an interlace may be non-contiguous. In some examples, each resource block may include a plurality of contiguous resource elements spanning time (e.g., a plurality of symbol periods within a subframe) and frequency (e.g., a plurality of frequency tones).

The symbol period blanker 2515 may be configured to identify a subframe in which random access data transmissions will be made on the at least one interlace of non-contiguous frequency resources (e.g., by the random access sequence transmission manager 2405-a or the modified random access sequence transmission manager 2410-a), and cause the random access sequence transmission manager 2405-a and modified random access sequence transmission manager 2410-a to refrain from transmitting a sequence of deterministic variations of random access data or at least one modification of the sequence of deterministic variations of random access data during a temporally last symbol period of the subframe (e.g., blanking the temporally last symbol period of the subframe), as described above with reference to FIGS. 18-22.

The edge tone blanker 2520 may be configured cause the random access sequence transmission manager 2405-a and modified random access sequence transmission manager 2410-a to refrain from transmitting a sequence of deterministic variations of random access data or at least one modification of the sequence of deterministic variations of random access data on a set of edge tones of resource block in the at least one interlace of non-contiguous frequency resources (e.g., blanking one or both edge tones of each resource block in the at least one interlace of non-contiguous frequency resources, or blanking edge tones adjacent resource blocks that are not included in the at least one interlace of non-contiguous frequency resources), as described above with reference to FIG. 19.

The comb identifier 2525 may be configured to identify at least one comb of non-contiguous frequency resources, within the at least one interlace of non-contiguous frequency resources, for transmitting the sequence of deterministic variations of random access data or the at least one modification of the sequence of deterministic variations of random access data, as described above with reference to FIG. 20.

The connection request transmission manager 2530 may be configured to transmit second random access data on the at least one interlace, beginning at a fourth time, as described above with reference to FIG. 22. In some examples, the second random access data may include a RRC connection request. In some examples, the second random access data may be transmitted repetitively and/or in modified form, similarly to the random access data transmitted by the random access sequence transmission manager 2405-a or modified random access sequence transmission manager 2410-a.

Figure 26:
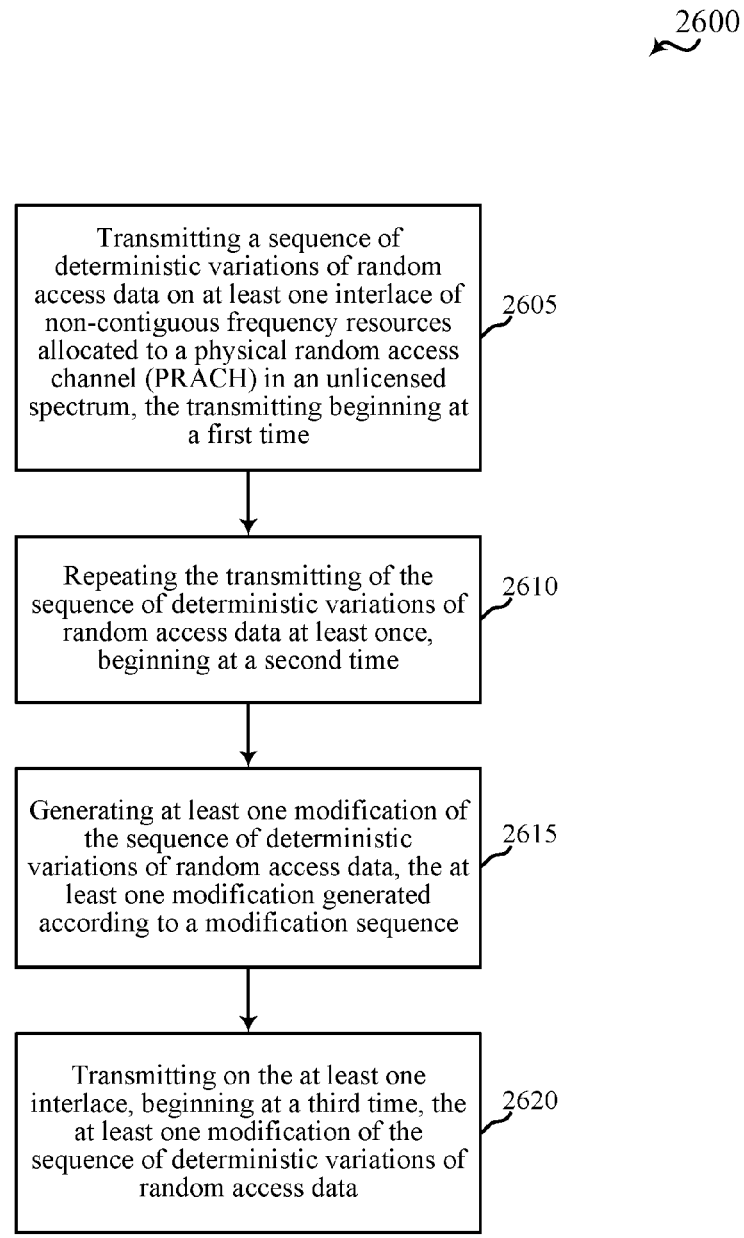
FIG. 26 shows a flowchart illustrating a method of wireless communication in accordance with various aspects of the present disclosure.

FIG. 26 shows a flowchart illustrating a method 2600 of wireless communication in accordance with various aspects of the present disclosure. The operations of method 2600 may be implemented by a wireless device (e.g., a UE 115, a wireless device 2300 or a wireless device 2400) or its components as described with reference to FIGS. 1-5, 9, and 17-25. For example, the operations of method 2600 may be performed by the random access manager 2310 as described with reference to FIGS. 23-25. In some examples, a wireless device may execute a set of codes to control the functional elements of the wireless device to perform the functions described below. Additionally or alternatively, the wireless device may perform aspects the functions described below using special-purpose hardware.

At block 2605, the method may include transmitting a sequence of deterministic variations of random access data on at least one interlace of non-contiguous frequency resources allocated to a PRACH in an unlicensed spectrum, as described above with reference to FIGS. 17-22. The transmitting may begin at a first time. In some examples, the at least one interlace of non-contiguous frequency resources may include one interlace or two interlaces. In some examples the sequence of deterministic variations of random access data may be based at least in part on a Zadoff-Chu sequence. In some examples, the random access data may include a random access preamble (e.g., a preamble including data that identifies the wireless device performing the method, such as a static or semi-static identifier of the wireless device, or random data). In some examples, the operations of block 2605 may be performed by the random access sequence transmission manager 2405, as described above with reference to FIG. 24-25.

At block 2610, the method may include repeating the transmitting of the sequence of deterministic variations of random access data at least once, beginning at a second time, as described above with reference to FIGS. 17-22. In some examples, the transmitting of the sequence of deterministic variations of random access data may be repeated two times, at two different times. In some examples, the operations of block 2610 may be performed by the random access sequence transmission manager 2405, as described above with reference to FIG. 24-25.

At block 2615, the method may include generating at least one modification of the sequence of deterministic variations of random access data, as described above with reference to FIGS. 17-22. The at least one modification of the sequence of deterministic variations of random access data may be generated according to a modification sequence. In some examples, the operations of block 2615 may be performed by the modified random access sequence transmission manager 2410, as described above with reference to FIG. 24-25.

At block 2620, the method may include transmitting on the at least one interlace, beginning at a third time, the at least one modification of the sequence of deterministic variations of random access data, as described above with reference to FIGS. 17-22. In some examples, the operations of block 2620 may be performed by the modified random access sequence transmission manager 2410, as described above with reference to FIG. 24-25.

In some examples, the method 2600 may include selecting the sequence of deterministic variations of random access data based at least in part on a root sequence index or a shift index, as described above with reference to FIGS. 3B and 17-22. In some examples, the method 2600 may include selecting an OCC. In these examples, the modification sequence used to generate the at least one modification of the sequence of deterministic variations of random access data, at block 2615, may be based at least in part on the selected OCC. In some examples of the method 2600, the first time, the second time, the third time, and other times at which the sequence of deterministic variations of random access data or a modification of the sequence of deterministic variations of random access data is transmitted may occur in different TTIs.

In some examples of the method 2600, the method 2600 may include windowing at least one of: a temporally first transmission of the sequence of deterministic variations of random access data, a temporally first transmission of a modified sequence of deterministic variations of random access data, a temporally last transmission of the sequence of deterministic variations of random access data, or a temporally last transmission of a modified sequence of deterministic variations of random access data, as described above with reference to FIG. 21.

Figure 27:
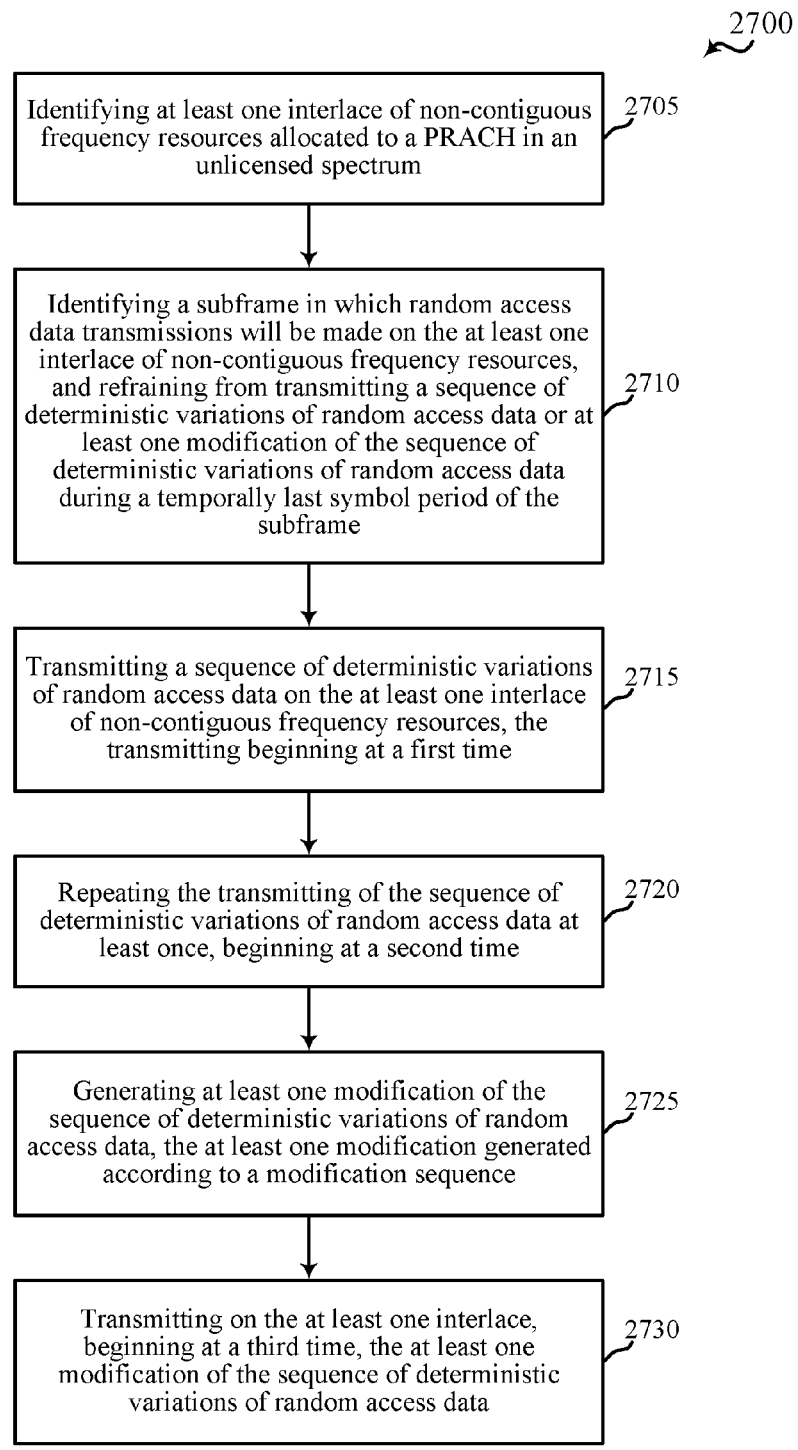
FIG. 27 shows a flowchart illustrating a method of wireless communication in accordance with various aspects of the present disclosure.

FIG. 27 shows a flowchart illustrating a method 2700 of wireless communication in accordance with various aspects of the present disclosure. The operations of method 2600 may be implemented by a wireless device (e.g., a UE 115, a wireless device 2300 or a wireless device 2400) or its components as described with reference to FIGS. 1-5, 9, and 17-25. For example, the operations of method 2700 may be performed by the random access manager 2310 as described with reference to FIGS. 23-25. In some examples, a wireless device may execute a set of codes to control the functional elements of the wireless device to perform the functions described below. Additionally or alternatively, the wireless device may perform aspects the functions described below using special-purpose hardware.

At block 2705, the method may include identifying at least one interlace of non-contiguous frequency resources allocated to a PRACH in an unlicensed spectrum, as described above with reference to FIG. 17. In some examples, the non-contiguous frequency resources may include a plurality of resource blocks. In some examples, each of the resource blocks of an interlace may be non-contiguous with all other resource blocks of the interlace. In other examples, two or more sets of contiguous resource blocks in an interlace may be non-contiguous. In some examples, each resource block may include a plurality of contiguous resource elements spanning time (e.g., a plurality of symbol periods within a subframe) and frequency (e.g., a plurality of frequency tones). In some examples, the operations of block 2705 may be performed by the PRACH resource identifier 2505 or interlace identifier 2510, as described above with reference to FIG. 25.

At block 2710, the method may include identifying a subframe in which random access data transmissions will be made on the at least one interlace of non-contiguous frequency resources (e.g., at block 2715, 2720, and 2730), and refraining from transmitting a sequence of deterministic variations of random access data (at block 2715 or 2720) and at least one modification of the sequence of deterministic variations of random access data (at block 2730) during a temporally last symbol period of the subframe (e.g., blanking the temporally last symbol period of the subframe), as described above with reference to FIGS. 18-22. In some examples, the operations of block 2710 may be performed by the PRACH resource identifier 2505 or symbol period blanker 2515, as described above with reference to FIG. 25.

At block 2715, the method may include transmitting a sequence of deterministic variations of random access data on the at least one interlace of non-contiguous frequency resources, as described above with reference to FIGS. 17-22. The transmitting may begin at a first time. In some examples, the at least one interlace of non-contiguous frequency resources may include one interlace or two interlaces. In some examples the sequence of deterministic variations of random access data may be based at least in part on a Zadoff-Chu sequence. In some examples, the random access data may include a random access preamble (e.g., a preamble including data that identifies the wireless device performing the method, such as a static or semi-static identifier of the wireless device, or random data). In some examples, the operations of block 2715 may be performed by the random access sequence transmission manager 2405, as described above with reference to FIG. 24-25.

At block 2720, the method may include repeating the transmitting of the sequence of deterministic variations of random access data at least once, beginning at a second time, as described above with reference to FIGS. 17-22. In some examples, the transmitting of the sequence of deterministic variations of random access data may be repeated two times, at two different times. In some examples, the operations of block 2720 may be performed by the random access sequence transmission manager 2405, as described above with reference to FIG. 24-25.

At block 2725, the method may include generating at least one modification of the sequence of deterministic variations of random access data, as described above with reference to FIGS. 17-22. The at least one modification of the sequence of deterministic variations of random access data may be generated according to a modification sequence. In some examples, the operations of block 2725 may be performed by the modified random access sequence transmission manager 2410, as described above with reference to FIG. 24-25.

At block 2730, the method may include transmitting on the at least one interlace, beginning at a third time, the at least one modification of the sequence of deterministic variations of random access data, as described above with reference to FIGS. 17-22. In some examples, the operations of block 2730 may be performed by the modified random access sequence transmission manager 2410, as described above with reference to FIG. 24-25.

In some examples, the method 2700 may include selecting the sequence of deterministic variations of random access data based at least in part on a root sequence index or a shift index, as described above with reference to FIGS. 3B and 17-22. In some examples, the method 2700 may include selecting an OCC. In these examples, the modification sequence used to generate the at least one modification of the sequence of deterministic variations of random access data, at block 2715, may be based at least in part on the selected OCC. In some examples of the method 2700, the first time, the second time, the third time, and other times at which the sequence of deterministic variations of random access data or a modification of the sequence of deterministic variations of random access data is transmitted may occur in different TTIs.

Figure 28:
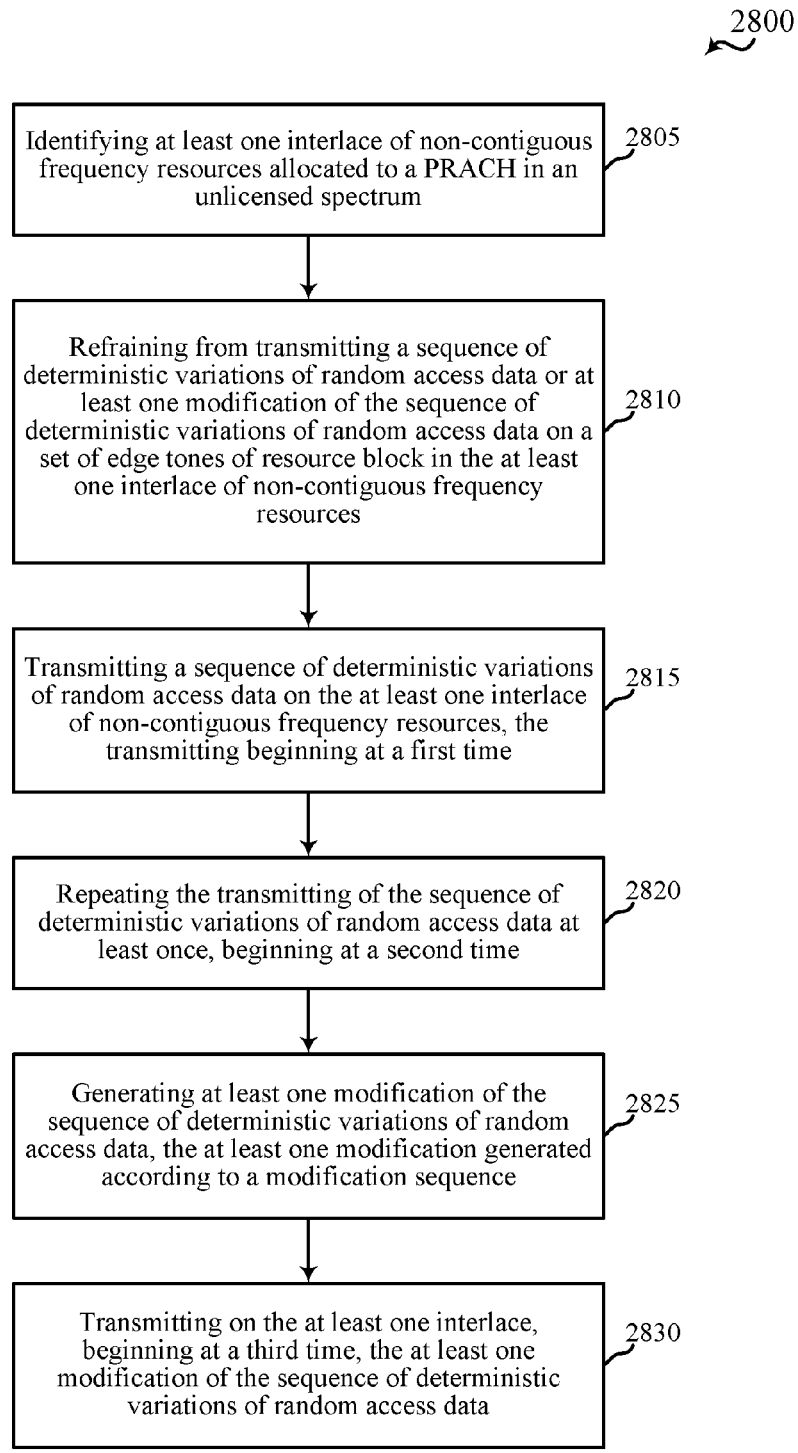
FIG. 28 shows a flowchart illustrating a method of wireless communication in accordance with various aspects of the present disclosure.

FIG. 28 shows a flowchart illustrating a method 2800 of wireless communication in accordance with various aspects of the present disclosure. The operations of method 2800 may be implemented by a wireless device (e.g., a UE 115, a wireless device 2300 or a wireless device 2400) or its components as described with reference to FIGS. 1-5, 9, and 17-25. For example, the operations of method 2800 may be performed by the random access manager 2310 as described with reference to FIGS. 23-25. In some examples, a wireless device may execute a set of codes to control the functional elements of the wireless device to perform the functions described below. Additionally or alternatively, the wireless device may perform aspects the functions described below using special-purpose hardware.

At block 2805, the method may include identifying at least one interlace of non-contiguous frequency resources allocated to a PRACH in an unlicensed spectrum, as described above with reference to FIG. 17. In some examples, the non-contiguous frequency resources may include a plurality of resource blocks. In some examples, each of the resource blocks of an interlace may be non-contiguous with all other resource blocks of the interlace. In other examples, two or more sets of contiguous resource blocks in an interlace may be non-contiguous. In some examples, each resource block may include a plurality of contiguous resource elements spanning time (e.g., a plurality of symbol periods within a subframe) and frequency (e.g., a plurality of frequency tones). In some examples, the operations of block 2805 may be performed by the PRACH resource identifier 2505 or interlace identifier 2510, as described above with reference to FIG. 25.

At block 2810, the method may include refraining from transmitting a sequence of deterministic variations of random access data (at block 2815 or 2820) and at least one modification of the sequence of deterministic variations of random access data (at block 2830) on a set of edge tones of resource block in the at least one interlace of non-contiguous frequency resources (e.g., blanking one or both edge tones of each resource block in the at least one interlace of non-contiguous frequency resources, or blanking edge tones adjacent resource blocks that are not included in the at least one interlace of non-contiguous frequency resources), as described above with reference to FIG. 19. In some examples, the operations of block 2810 may be performed by the PRACH resource identifier 2505 or edge tone blanker 2520, as described above with reference to FIG. 25.

At block 2815, the method may include transmitting a sequence of deterministic variations of random access data on the at least one interlace of non-contiguous frequency resources, as described above with reference to FIGS. 17-22. The transmitting may begin at a first time. In some examples, the at least one interlace of non-contiguous frequency resources may include one interlace or two interlaces. In some examples the sequence of deterministic variations of random access data may be based at least in part on a Zadoff-Chu sequence. In some examples, the random access data may include a random access preamble (e.g., a preamble including data that identifies the wireless device performing the method, such as a static or semi-static identifier of the wireless device, or random data). In some examples, the operations of block 2815 may be performed by the random access sequence transmission manager 2405, as described above with reference to FIG. 24-25.

At block 2820, the method may include repeating the transmitting of the sequence of deterministic variations of random access data at least once, beginning at a second time, as described above with reference to FIGS. 17-22. In some examples, the transmitting of the sequence of deterministic variations of random access data may be repeated two times, at two different times. In some examples, the operations of block 2820 may be performed by the random access sequence transmission manager 2405, as described above with reference to FIG. 24-25.

At block 2825, the method may include generating at least one modification of the sequence of deterministic variations of random access data, as described above with reference to FIGS. 17-22. The at least one modification of the sequence of deterministic variations of random access data may be generated according to a modification sequence. In some examples, the operations of block 2825 may be performed by the modified random access sequence transmission manager 2410, as described above with reference to FIG. 24-25.

At block 2830, the method may include transmitting on the at least one interlace, beginning at a third time, the at least one modification of the sequence of deterministic variations of random access data, as described above with reference to FIGS. 17-22. In some examples, the operations of block 2830 may be performed by the modified random access sequence transmission manager 2410, as described above with reference to FIG. 24-25.

In some examples, the method 2800 may include selecting the sequence of deterministic variations of random access data based at least in part on a root sequence index or a shift index, as described above with reference to FIGS. 3B and 17-22. In some examples, the method 2800 may include selecting an OCC. In these examples, the modification sequence used to generate the at least one modification of the sequence of deterministic variations of random access data, at block 2815, may be based at least in part on the selected OCC. In some examples of the method 2800, the first time, the second time, the third time, and other times at which the sequence of deterministic variations of random access data or a modification of the sequence of deterministic variations of random access data is transmitted may occur in different TTIs.

Figure 29:
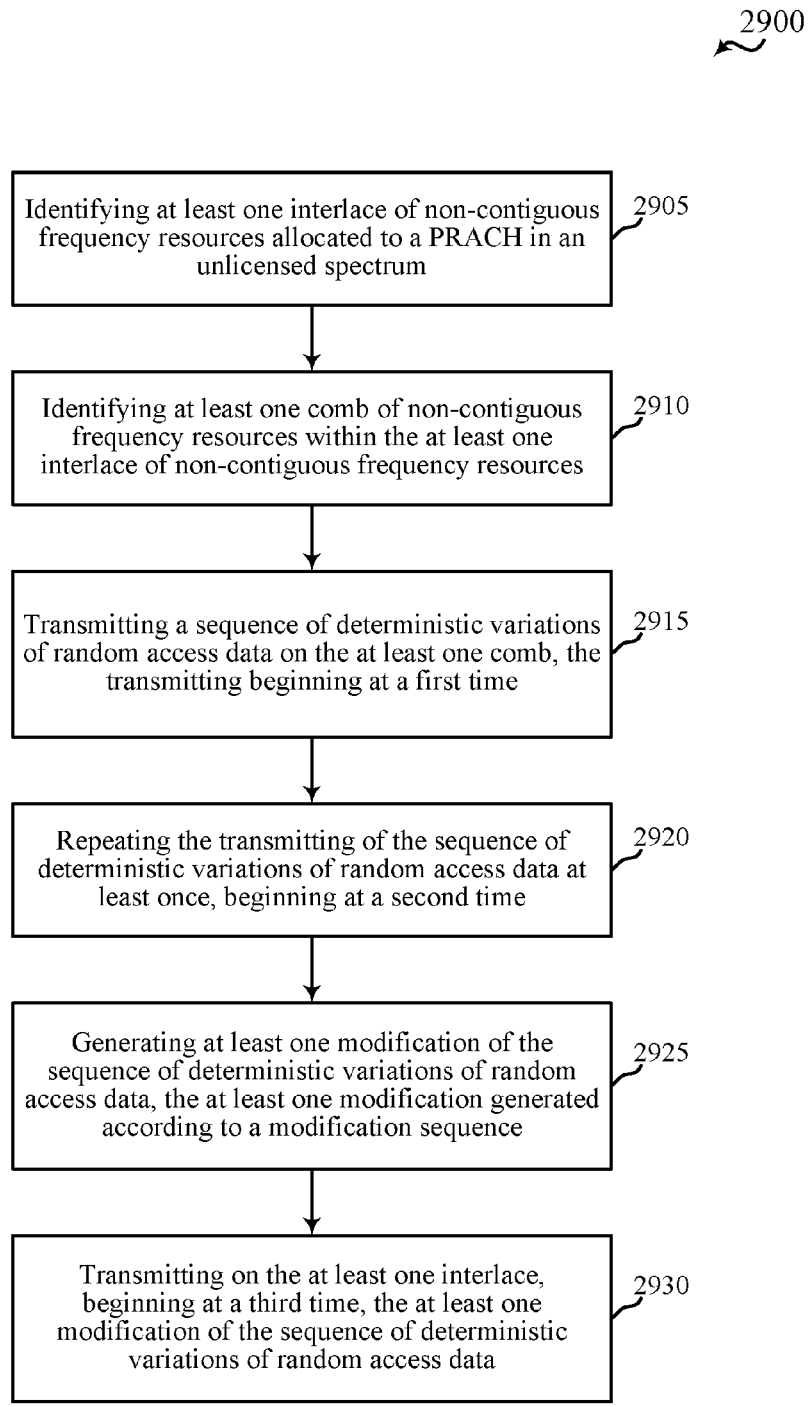
FIG. 29 shows a flowchart illustrating a method of wireless communication in accordance with various aspects of the present disclosure.

FIG. 29 shows a flowchart illustrating a method 2900 of wireless communication in accordance with various aspects of the present disclosure. The operations of method 2900 may be implemented by a wireless device (e.g., a UE 115, a wireless device 2300 or a wireless device 2400) or its components as described with reference to FIGS. 1-5, 9, and 17-25. For example, the operations of method 2900 may be performed by the random access manager 2310 as described with reference to FIGS. 23-25. In some examples, a wireless device may execute a set of codes to control the functional elements of the wireless device to perform the functions described below. Additionally or alternatively, the wireless device may perform aspects the functions described below using special-purpose hardware.

At block 2905, the method may include identifying at least one interlace of non-contiguous frequency resources allocated to a PRACH in an unlicensed spectrum, as described above with reference to FIG. 17. In some examples, the non-contiguous frequency resources may include a plurality of resource blocks. In some examples, each of the resource blocks of an interlace may be non-contiguous with all other resource blocks of the interlace. In other examples, two or more sets of contiguous resource blocks in an interlace may be non-contiguous. In some examples, each resource block may include a plurality of contiguous resource elements spanning time (e.g., a plurality of symbol periods within a subframe) and frequency (e.g., a plurality of frequency tones). In some examples, the operations of block 2905 may be performed by the PRACH resource identifier 2505 or interlace identifier 2510, as described above with reference to FIG. 25.

At block 2910, the method may include identifying at least one comb of non-contiguous frequency resources within the at least one interlace of non-contiguous frequency resources, as described above with reference to FIG. 20. In some examples, the operations of block 2910 may be performed by the PRACH resource identifier 2505 or comb identifier 2525, as described above with reference to FIG. 25.

At block 2915, the method may include transmitting a sequence of deterministic variations of random access data on the at least one comb, as described above with reference to FIGS. 17-22. The transmitting may begin at a first time. In some examples, the at least one interlace of non-contiguous frequency resources may include one interlace or two interlaces. In some examples the sequence of deterministic variations of random access data may be based at least in part on a Zadoff-Chu sequence. In some examples, the random access data may include a random access preamble (e.g., a preamble including data that identifies the wireless device performing the method, such as a static or semi-static identifier of the wireless device, or random data). In some examples, the operations of block 2915 may be performed by the random access sequence transmission manager 2405, as described above with reference to FIG. 24-25.

At block 2920, the method may include repeating the transmitting of the sequence of deterministic variations of random access data at least once, beginning at a second time, as described above with reference to FIGS. 17-22. In some examples, the transmitting of the sequence of deterministic variations of random access data may be repeated two times, at two different times. In some examples, the operations of block 2920 may be performed by the random access sequence transmission manager 2405, as described above with reference to FIG. 24-25.

At block 2925, the method may include generating at least one modification of the sequence of deterministic variations of random access data, as described above with reference to FIGS. 17-22. The at least one modification of the sequence of deterministic variations of random access data may be generated according to a modification sequence. In some examples, the operations of block 2925 may be performed by the modified random access sequence transmission manager 2410, as described above with reference to FIG. 24-25.

At block 2930, the method may include transmitting on the at least one comb, beginning at a third time, the at least one modification of the sequence of deterministic variations of random access data, as described above with reference to FIGS. 17-22. In some examples, the operations of block 2930 may be performed by the modified random access sequence transmission manager 2410, as described above with reference to FIG. 24-25.

In some examples, the method 2900 may include selecting the sequence of deterministic variations of random access data based at least in part on a root sequence index or a shift index, as described above with reference to FIGS. 3B and 17-22. In some examples, the method 2900 may include selecting an OCC. In these examples, the modification sequence used to generate the at least one modification of the sequence of deterministic variations of random access data, at block 2915, may be based at least in part on the selected OCC. In some examples of the method 2900, the first time, the second time, the third time, and other times at which the sequence of deterministic variations of random access data or a modification of the sequence of deterministic variations of random access data is transmitted may occur in different TTIs.

Figure 30:
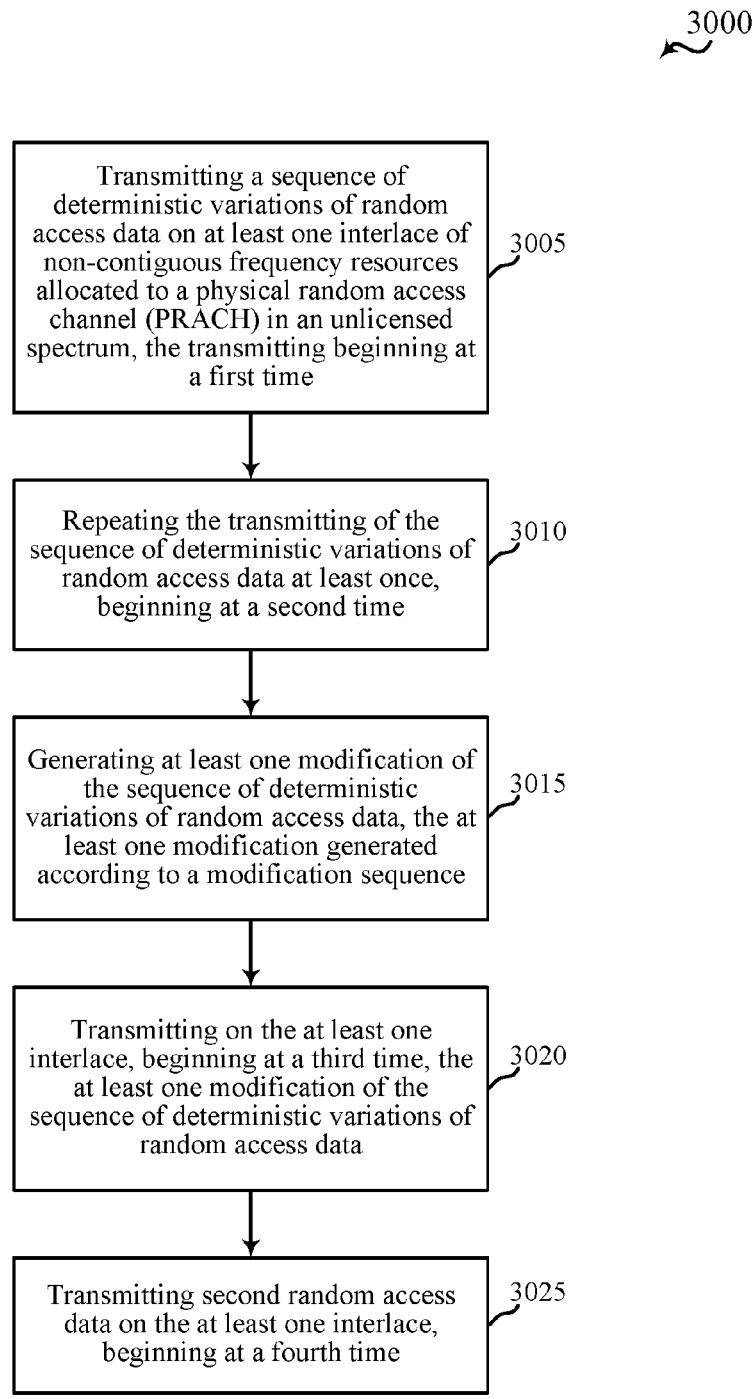
FIG. 30 shows a flowchart illustrating a method of wireless communication in accordance with various aspects of the present disclosure.

FIG. 30 shows a flowchart illustrating a method 3000 of wireless communication in accordance with various aspects of the present disclosure. The operations of method 3000 may be implemented by a wireless device (e.g., a UE 115, a wireless device 2300 or a wireless device 2400) or its components as described with reference to FIGS. 1-5, 9, and 17-25. For example, the operations of method 3000 may be performed by the random access manager 2310 as described with reference to FIGS. 23-25. In some examples, a wireless device may execute a set of codes to control the functional elements of the wireless device to perform the functions described below. Additionally or alternatively, the wireless device may perform aspects the functions described below using special-purpose hardware.

At block 3005, the method may include transmitting a sequence of deterministic variations of random access data on at least one interlace of non-contiguous frequency resources allocated to a PRACH in an unlicensed spectrum, as described above with reference to FIGS. 17-22. The transmitting may begin at a first time. In some examples, the at least one interlace of non-contiguous frequency resources may include one interlace or two interlaces. In some examples the sequence of deterministic variations of random access data may be based at least in part on a Zadoff-Chu sequence. In some examples, the random access data may include a random access preamble (e.g., a preamble including data that identifies the wireless device performing the method, such as a static or semi-static identifier of the wireless device, or random data). In some examples, the operations of block 3005 may be performed by the random access sequence transmission manager 2405, as described above with reference to FIG. 24-25.

At block 3010, the method may include repeating the transmitting of the sequence of deterministic variations of random access data at least once, beginning at a second time, as described above with reference to FIGS. 17-22. In some examples, the transmitting of the sequence of deterministic variations of random access data may be repeated two times, at two different times. In some examples, the operations of block 3010 may be performed by the random access sequence transmission manager 2405, as described above with reference to FIG. 24-25.

At block 3015, the method may include generating at least one modification of the sequence of deterministic variations of random access data, as described above with reference to FIGS. 17-22. The at least one modification of the sequence of deterministic variations of random access data may be generated according to a modification sequence. In some examples, the operations of block 3015 may be performed by the modified random access sequence transmission manager 2410, as described above with reference to FIG. 24-25.

At block 3020, the method may include transmitting on the at least one interlace, beginning at a third time, the at least one modification of the sequence of deterministic variations of random access data, as described above with reference to FIGS. 17-22. In some examples, the operations of block 3020 may be performed by the modified random access sequence transmission manager 2410, as described above with reference to FIG. 24-25.

At block 3025, the method may include transmitting second random access data on the at least one interlace, beginning at a fourth time, as described above with reference to FIG. 22. In some examples, the second random access data may include a RRC connection request. In some examples, the second random access data may be transmitted repetitively and/or in modified form, similarly to the random access data transmitted at blocks 3005, 3010, and 3020. In some examples, the operations of block 3025 may be performed by the connection request transmission manager 2530, as described above with reference to FIG. 25.

In some examples, the method 3000 may include selecting the sequence of deterministic variations of random access data based at least in part on a root sequence index or a shift index, as described above with reference to FIGS. 3B and 17-22. In some examples, the method 3000 may include selecting an OCC. In these examples, the modification sequence used to generate the at least one modification of the sequence of deterministic variations of random access data, at block 3015, may be based at least in part on the selected OCC. In some examples of the method 2600, the first time, the second time, the third time, and other times at which the sequence of deterministic variations of random access data or a modification of the sequence of deterministic variations of random access data is transmitted may occur in different TTIs.

Thus, methods 2600, 2700, 2800, 2900, and 3000 may provide for coverage enhancement in a wireless system. It should be noted that methods 2600, 2700, 2800, 2900, and 3000 describe possible implementations, and that the operations and the steps may be rearranged or otherwise modified such that other implementations are possible. In some examples, aspects from two or more of the methods 2600, 2700, 2800, 2900, and 3000 (or two or more of the methods 1100, 1200, 1300, 1400, 1500, 1600, 2600, 2700, 2800, 2900, and 3000) may be combined.

The detailed description set forth above in connection with the appended drawings describes exemplary examples and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communication systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication system (UMTS). 3GPP Long Term Evolution (LTE) and LTE-Advanced (LTE-A) are new releases of Universal Mobile Telecommunication system (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication, comprising:
   transmitting, by a user equipment (UE) to a base station, a sequence of deterministic variations of random access data on at least one interlace of non-contiguous frequency resources allocated to a physical random access channel (PRACH) in an unlicensed spectrum, the transmitting beginning at a first time;
   repeating the transmitting of the sequence of deterministic variations of random access data at least once, beginning at a second time;
   generating at least one modification of the sequence of deterministic variations of random access data, the at least one modification generated according to a modification sequence; and
   transmitting, by the UE to the base station, on the at least one interlace, beginning at a third time, the at least one modification of the sequence of deterministic variations of random access data.

2. The method of claim 1, wherein the transmissions on the at least one interlace occur within a subframe, the method further comprising:
   refraining from transmitting, during a temporally last symbol period of the subframe, the sequence of deterministic variations of random access data or the at least one modification of the sequence of deterministic variations of random access data.

3. The method of claim 1, further comprising:
   refraining from transmitting, on a set of edge tones of resource blocks in the at least one interlace of non-contiguous frequency resources, the sequence of deterministic variations of random access data or the at least one modification of the sequence of deterministic variations of random access data.

4. The method of claim 1, further comprising:
   identifying at least one comb of non-contiguous frequency resources within the at least one interlace of non-contiguous frequency resources;
   wherein the sequence of deterministic variations of random access data or the at least one modification of the sequence of deterministic variations of random access data are transmitted on the at least one comb.

5. The method of claim 1, further comprising:
   windowing at least one of: a temporally first transmission of the sequence of deterministic variations of random access data, a temporally first transmission of a modified sequence of deterministic variations of random access data, a temporally last transmission of a sequence of deterministic variations of random access data, or a temporally last transmission of a modified sequence of deterministic variations of random access data.

6. The method of claim 1, further comprising:
   transmitting second random access data on the at least one interlace, beginning at a fourth time;
   wherein the transmitting the sequence of deterministic variations of random access data, the transmitting the modified sequence of deterministic variations of random access data, and the transmitting second random access data are multiplexed within a subframe.

7. The method of claim 6, wherein the random access data comprises a random access preamble and the second random access data comprises a radio resource control (RRC) connection request.

8. The method of claim 1, further comprising:
   selecting an orthogonal cover code (OCC);
   wherein the modification sequence is based at least in part on the selected OCC.

9. The method of claim 1, wherein the first time, second time, and third time occur in different transmission time intervals (TTIs).

10. The method of claim 1, wherein the transmitting of the sequence of deterministic variations of random access data is repeated two times, at two different times.

11. The method of claim 1, wherein the at least one interlace of non-contiguous frequency resources comprises two interlaces of non-contiguous frequency resources.

12. The method of claim 1, further comprising:
   selecting the sequence of deterministic variations of random access data based at least in part on a root sequence index or a shift index.

13. The method of claim 1, wherein the sequence of deterministic variations of random access data is based at least in part on a Zadoff-Chu sequence.

14. A method of wireless communication
   identifying a time domain bundling parameter of a user equipment (UE) that indicates redundant versions of a transmission are to be transmitted from the UE;
   determining that data is to be transmitted from the UE according to the time domain bundling parameter;
   identifying a sequence of deterministic variations for use in transmitting the data;

applying the sequence of deterministic variations to consecutive transmissions of the data;
generating at least one modification of the sequence of deterministic variations of random access data; and
transmitting, by a user equipment (UE) to a base station, the at least one modification of the sequence of deterministic variations.

15. The method of claim 14, wherein the data is to be transmitted on a physical random access channel (PRACH).

16. The method of claim 14, wherein the sequence of deterministic variations comprises a Zadoff-Chu sequence.

17. A user equipment (UE) for wireless communication, comprising:
a processor;
memory in electronic communication with the processor; and
instructions stored in the memory; wherein the instructions are executable by the processor to:
transmit, to a base station, a sequence of deterministic variations of random access data on at least one interlace of non-contiguous frequency resources allocated to a physical random access channel (PRACH) in an unlicensed spectrum, the transmitting beginning at a first time;
repeat the transmitting of the sequence of deterministic variations of random access data at least once, beginning at a second time;
generate at least one modification of the sequence of deterministic variations of random access data, the at least one modification generated according to a modification sequence; and
transmit, to the base station, on the at least one interlace, beginning at a third time, the at least one modification of the sequence of deterministic variations of random access data.

18. The UE of claim 17, wherein the transmissions on the at least one interlace occur within a subframe, and the instructions are executable by the processor to:
refrain from transmitting, during a temporally last symbol period of the subframe, the sequence of deterministic variations of random access data or the at least one modification of the sequence of deterministic variations of random access data.

19. The UE of claim 17, wherein the instructions are executable by the processor to:
refrain from transmitting, on a set of edge tones of resource blocks in the at least one interlace of non-contiguous frequency resources, the sequence of deterministic variations of random access data or the at least one modification of the sequence of deterministic variations of random access data.

20. The UE of claim 17, wherein the instructions are executable by the processor to:
identify at least one comb of non-contiguous frequency resources within the at least one interlace of non-contiguous frequency resources;
wherein the sequence of deterministic variations of random access data or the at least one modification of the sequence of deterministic variations of random access data are transmitted on the at least one comb.

21. The UE of claim 17, wherein the instructions are executable by the processor to:
window at least one of: a temporally first transmission of the sequence of deterministic variations of random access data, a temporally first transmission of a modified sequence of deterministic variations of random access data, a temporally last transmission of a sequence of deterministic variations of random access data, or a temporally last transmission of a modified sequence of deterministic variations of random access data.

22. The UE of claim 17, wherein the instructions are executable by the processor to:
transmit second random access data on the at least one interlace, beginning at a fourth time;
wherein the transmitting the sequence of deterministic variations of random access data, the transmitting the modified sequence of deterministic variations of random access data, and the transmitting second random access data are multiplexed within a subframe.

23. The UE of claim 22, wherein the random access data comprises a random access preamble and the second random access data comprises a radio resource control (RRC) connection request.

24. The UE of claim 17, wherein the instructions are executable by the processor to:
select an orthogonal cover code (OCC);
wherein the modification sequence is based at least in part on the selected OCC.

25. The UE of claim 17, wherein the first time, second time, and third time occur in different transmission time intervals (TTIs).

26. The UE of claim 17, wherein the instructions are executable by the processor to:
select the sequence of deterministic variations of random access data based at least in part on a root sequence index or a shift index.

27. The UE of claim 17, wherein the sequence of deterministic variations of random access data is based at least in part on a Zadoff-Chu sequence.

28. A user equipment (UE) for wireless communication, comprising:
a processor;
memory in electronic communication with the processor; and
instructions stored in the memory; wherein the instructions are executable by the processor to:
identify a time domain bundling parameter of a user equipment (UE) that indicates redundant versions of a transmission are to be transmitted from the UE;
determine that data is to be transmitted from the UE according to the time domain bundling parameter;
identify a sequence of deterministic variations for use in transmitting the data;
apply the sequence of deterministic variations to consecutive transmissions of the data;
generate at least one modification of the sequence of deterministic variations of random access data; and
transmit, to a base station, the at least one modification of the sequence of deterministic variations.

29. The UE of claim 28, wherein the data is to be transmitted on a physical random access channel (PRACH).

30. The UE of claim 28, wherein the sequence of deterministic variations comprises a Zadoff-Chu sequence.

* * * * *